United States Patent
Zhang et al.

(10) Patent No.: US 11,605,211 B2
(45) Date of Patent: Mar. 14, 2023

(54) OBJECT DETECTION MODEL TRAINING METHOD AND APPARATUS, AND DEVICE

(71) Applicant: Huawei Cloud Computing Technologies Co., Ltd., Guizhou (CN)

(72) Inventors: Changzheng Zhang, Shenzhen (CN); Xin Jin, Beijing (CN); Dandan Tu, Shenzhen (CN)

(73) Assignee: HUAWEI CLOUD COMPUTING TECHNOLOGIES CO., LTD., Guizhou (CN)

(*) Notice: Subject to any disclaimer, the term of this patent is extended or adjusted under 35 U.S.C. 154(b) by 0 days.

(21) Appl. No.: 17/036,903

(22) Filed: Sep. 29, 2020

(65) Prior Publication Data
US 2021/0012136 A1 Jan. 14, 2021

Related U.S. Application Data

(63) Continuation of application No. PCT/CN2019/076992, filed on Mar. 5, 2019.

(30) Foreign Application Priority Data

Aug. 3, 2018 (CN) .......................... 201810878556.9
Aug. 28, 2018 (CN) .......................... 201810987040.8

(51) Int. Cl.
*G06V 10/20* (2022.01)
*G06T 7/11* (2017.01)
(Continued)

(52) U.S. Cl.
CPC .......... *G06V 10/255* (2022.01); *G06K 9/6215* (2013.01); *G06K 9/6218* (2013.01);
(Continued)

(58) Field of Classification Search
CPC .... G06V 10/255; G06V 10/454; G06V 10/25; G06V 10/82; G06V 40/172;
(Continued)

(56) References Cited

U.S. PATENT DOCUMENTS 7,295,687 B2 11/2007 Kee et al.
9,904,871 B2 2/2018 Merhav et al.
(Continued)

FOREIGN PATENT DOCUMENTS

CN 103150903 A 6/2013
CN 103324938 A 9/2013
(Continued)

OTHER PUBLICATIONS

XP081232887, Hu, X., et al., "SINet: A Scale-insensitive Convolutional Neural Network for Fast vehicle Detection," IEEE Transactions on Intelligent Transportation Systems, vol. 20, No. 3, May 16, 2018, 10 pages.
(Continued)

*Primary Examiner* — Juan A Torres
(74) *Attorney, Agent, or Firm* — Conley Rose, P.C.

(57) ABSTRACT

An object detection model training method performed by a computing device, includes obtaining a system parameter including at least one of a receptive field of a backbone network, a size of a training image, a size of a to-be-detected object in the training image, a training computing capability, or a complexity of the to-be-detected object, determining a configuration parameter based on the system parameter, establishing a variable convolution network based on the configuration parameter and a feature map of the backbone network, recognizing the to-be-detected object based on a feature of the variable convolution network, and training the backbone network and the variable convolution network, where a convolution core used by any variable convolution
(Continued)

layer may be offset in any direction in a process of performing convolution.

20 Claims, 17 Drawing Sheets

(51) Int. Cl.
 *G06K 9/62* (2022.01)
 *G06N 3/04* (2023.01)
 *G06V 10/44* (2022.01)
(52) U.S. Cl.
 CPC ......... *G06K 9/6256* (2013.01); *G06N 3/0454* (2013.01); *G06T 7/11* (2017.01); *G06V 10/454* (2022.01); *G06T 2207/20081* (2013.01)
(58) Field of Classification Search
 CPC .. G06K 9/6215; G06K 9/6218; G06K 9/6256; G06K 9/6272; G06K 9/6262; G06K 9/627; G06N 3/0454; G06N 3/08; G06T 7/11; G06T 2207/20081
 USPC .......................................................... 382/103
 See application file for complete search history.

(56) References Cited

U.S. PATENT DOCUMENTS

| | | | |
|---|---|---|---|
| 9,977,997 B2* | 5/2018 | Bai | G06V 10/44 |
| 10,102,444 B2* | 10/2018 | Kim | G06V 10/462 |
| 10,296,813 B2* | 5/2019 | Chen | G06N 3/08 |
| 10,303,977 B2* | 5/2019 | Wshah | G06N 3/08 |
| 10,417,525 B2* | 9/2019 | Ji | G06K 9/6272 |
| 10,438,112 B2* | 10/2019 | Zhang | G06N 3/082 |
| 10,467,526 B1* | 11/2019 | Appalaraju | G06N 3/08 |
| 10,769,532 B2* | 9/2020 | Dang | G06N 3/0454 |
| 2004/0179719 A1 | 9/2004 | Chen et al. | |
| 2017/0083752 A1 | 3/2017 | Saberian et al. | |
| 2017/0206431 A1 | 7/2017 | Sun et al. | |
| 2017/0220904 A1 | 8/2017 | Bai et al. | |
| 2018/0025256 A1 | 1/2018 | Bai et al. | |
| 2018/0060698 A1 | 3/2018 | Hua et al. | |
| 2018/0211107 A1 | 7/2018 | Segalovitz et al. | |

FOREIGN PATENT DOCUMENTS

| | | |
|---|---|---|
| CN | 103426008 A | 12/2013 |
| CN | 103942558 A | 7/2014 |
| CN | 104217216 A | 12/2014 |
| CN | 104794501 A | 7/2015 |
| CN | 104866810 A | 8/2015 |
| CN | 105184312 A | 12/2015 |
| CN | 105678267 A | 6/2016 |
| CN | 105760833 A | 7/2016 |
| CN | 105760859 A | 7/2016 |
| CN | 105868797 A | 8/2016 |
| CN | 105912990 A | 8/2016 |
| CN | 105931255 A | 9/2016 |
| CN | 105975931 A | 9/2016 |
| CN | 106156807 A | 11/2016 |
| CN | 106295714 A | 1/2017 |
| CN | 106548159 A | 3/2017 |
| CN | 106570522 A | 4/2017 |
| CN | 106599900 A | 4/2017 |
| CN | 106778472 A | 5/2017 |
| CN | 106845529 A | 6/2017 |
| CN | 107273897 A | 10/2017 |
| CN | 107437081 A | 12/2017 |
| CN | 107463919 A | 12/2017 |
| CN | 107609519 A | 1/2018 |
| CN | 107622272 A | 1/2018 |
| CN | 107844743 A | 3/2018 |
| CN | 107871134 A | 4/2018 |
| CN | 108038474 A | 5/2018 |
| CN | 108073917 A | 5/2018 |
| CN | 108108676 A | 6/2018 |
| CN | 108109385 A | 6/2018 |
| CN | 108121986 A | 6/2018 |
| CN | 108256562 A | 7/2018 |
| CN | 108304820 A | 7/2018 |
| CN | 108399454 A | 8/2018 |
| EP | 3065085 A1 | 9/2016 |

OTHER PUBLICATIONS

Wang, Y., "Detecting Faces Using Region-based Fully Convolutional Networks," Sep. 18, 2017, 10 pages.
Wang, H., "Face R-CNN," Jun. 4, 2017, 10 pages.
Du Lan, et al., "Target Detection Method Based on Convolutional Neural Network for SAR Image," Journal of Electronics and Information Technology, vol. 38, No. 12, Dec. 2016, with an English abstract, 8 pages.
Luo Haibo, et al., "Pedestrian detection algorithm based on dual-model fused fully convolutional networks (Invited)," Infrared and Laser Engineering ,vol. 47, No. 2, Feb. 2018, with an English abstract, 8 pages.
Zhen, O., et al., "Research of Image Classification Based on Transformable Convolutional Network," Software Guide , vol. 16, No. 6, Jun. 2017, with an English abstract, 4 pages.
Xu, Z., et al., "Deformable ConvNet with Aspect Ratio Constrained NMS for Object Detection in Remote Sensing Imagery," Remote Sens., 2017, 19 pages.
Dai, J., "Deformable Convolutional Networks," IEEE International Conference on Computer Vision, 2017, 10 pages.
Cheng, B., et al., "Revisiting rcnn: On awakening the classification power of faster rcnn," Proceedings of the European conference on computer vision (ECCV), 2018, 14 pages.
Ren, S., et al., "Faster r-cnn: Towards real-time object detection with region proposal networks," Advances in neural information processing systems 28, 2015, 9 pages.
Eggert, C., et al., "A closer look: Small object detection in faster R-CNN," IEEE international conference on multimedia and expo (ICME), Jul. 10-14, 2017, 6 pages.

* cited by examiner

OBJECT DETECTION MODEL TRAINING METHOD AND APPARATUS, AND DEVICE

CROSS-REFERENCE TO RELATED APPLICATIONS

This application is a continuation of International Patent Application No. PCT/CN2019/076992 filed on Mar. 5, 2019, which claims priority to Chinese Patent Application No. 201810987040.8 filed on Aug. 28, 2018, and Chinese Patent Application No. 201810878556.9 filed on Aug. 3, 2018. The disclosures of the aforementioned applications are hereby incorporated by reference in their entireties.

TECHNICAL FIELD

This application relates to the field of computer technologies, and in particular, to an object detection model training method, and an apparatus and a computing device that are configured to perform the method.

BACKGROUND

Object detection is an artificial intelligence technology that is used to accurately locate an object in an image/video and perform classification-based detection. The object detection includes various fields such as general object detection, face detection, pedestrian detection, and text detection. In recent years, academia and industry actively participate, and algorithms are increasingly mature. Currently, an object detection solution based on deep learning is used in actual products such as municipal security defense (such as pedestrian detection, vehicle detection, and license plate detection), finance (such as object detection and face-swiping login), the Internet (such as identity verification), and an intelligent terminal.

Currently, the object detection is widely applied in a plurality of simple/medium-complexity scenarios (for example, face detection in a door control scenario and a checkpoint scenario). In an open environment, it is still a to-be-resolved problem: how to maintain, using a trained object detection model, robustness of a plurality of unfavorable factors such as a large change of a size of a to-be-detected object, and obstruction and distortion of the to-be-detected object, and improve detection precision.

SUMMARY

This application provides an object detection model training method, and the method improves detection precision of a trained object detection model.

According to a first aspect, an object detection model training method performed by a computing device is provided. The computing device that performs the method may be one or more computing devices distributed in a same environment or different environments. The method includes obtaining a system parameter, where the system parameter includes at least one of a receptive field of a backbone network of the object detection model, a size of a training image, a size of a to-be-detected object in the training image, a training computing capability, or complexity of the to-be-detected object, and the system parameter that needs to be used in a subsequent process of determining a configuration parameter is obtained in this step, determining a configuration parameter of i variable convolution networks based on the system parameter, where the configuration parameter includes at least one of the quantity i of the variable convolution networks, a quantity $L_i$ of variable convolution layers included in an $i^{th}$ variable convolution network, a sliding span of a convolution core of the variable convolution network, a maximum offset distance, and a size of the convolution core, and both i and $L_i$ are integers greater than 0, obtaining the training image, and establishing the backbone network based on the training image, where the backbone network includes K convolution layers, establishing the i variable convolution networks based on a feature map output by the backbone network and the configuration parameter, where an offset distance when a convolution core of each variable convolution network performs convolution does not exceed the maximum offset distance, inputting features output by the i variable convolution networks into a classifier of the object detection model, and comparing the to-be-detected object that is in the training image and that is detected by the classifier and a prior result of the training image, and activating at least one of a model parameter of a convolution core of the backbone network, model parameters of convolution cores of the i variable convolution networks, the maximum offset distance, and a parameter of the classifier based on the comparison result.

In the foregoing provided method, the i variable convolution networks established based on the configuration parameter better adapt to a computing capability of a training environment or a status of a training image, thereby improving precision of a trained object detection model. In addition, the convolution core of the variable convolution network may be offset in a process of a convolution operation. This improves precision of recognizing, by the trained object detection model, an object that is seriously deformed and obstructed.

In a possible implementation, that in a process of establishing the i variable convolution networks based on a feature map output by the backbone network and the configuration parameter, a convolution sheet of a convolution core of any variable convolution layer may be offset includes offsetting, in any direction, a convolution sheet of a convolution core of a first variable convolution layer in the i variable convolution networks by a quantity of features, where the quantity does not exceed the maximum offset distance, and performing convolution on a model parameter of the convolution sheet of the convolution core of the first variable convolution layer and a feature that is of the first variable convolution layer and that is corresponding to a convolution sheet, obtained after the offsetting, of the convolution core of the first variable convolution layer, to obtain a feature of a second variable convolution layer of the i variable convolution networks, where the first variable convolution layer may belong to any variable convolution network, and the second variable convolution layer and the first variable convolution layer belong to a same variable convolution network.

In a possible implementation, that in a process of establishing the i variable convolution networks based on a feature map output by the backbone network and the configuration parameter, a convolution point of a convolution core of any variable convolution layer may be offset includes offsetting, in any direction, a convolution point in a convolution core of a third variable convolution layer in the i variable convolution networks by a quantity of features, where the quantity does not exceed the maximum offset distance, and performing convolution on a model parameter of the convolution point in the convolution core of the third variable convolution layer and a feature that is of the third variable convolution layer and that is corresponding to a convolution point, obtained after the offsetting, of the convolution core of the third variable convolution layer, to obtain a feature in a fourth variable convolution layer of the i variable convolution networks, where the third variable convolution layer may belong to any variable convolution network, and the fourth variable convolution layer and the third variable convolution layer belong to a same variable convolution network.

In the two offset methods described above, offset objects are respectively the convolution sheet and the convolution point. In both of the two offset methods, a scope of the convolution core on the convolution layer is no longer a cuboid or a cube, but an irregular shape, and the scope of the irregular convolution core makes the convolution core more sensitive to an object with relatively high complexity. Precision of recognizing, by an object detection model trained using such an offset method, a to-be-detected object with high detection complexity is higher.

In a possible implementation, establishing the i variable convolution networks based on a feature map output by the backbone network and the configuration parameter includes dividing the feature map output by the backbone network into i parts, where the i parts respectively serve as an initial variable convolution layer of the i variable convolution networks. Optionally, the feature map output by the backbone network may be evenly divided into i parts.

In a possible implementation, the training computing capability indicates a computing capability of the computing device.

In a possible implementation, the complexity of the to-be-detected object indicates detection complexity of the to-be-detected object.

A second aspect of this application provides a detection model training apparatus, including an initialization module, an object detection model, and an activation module. Different modules may be distributed and run on different computing devices. A combination of these modules provides the detection model training apparatus.

The initialization module is configured to obtain a system parameter, where the system parameter includes at least one of a receptive field of a backbone network of an object detection model, a size of a training image, a size of a to-be-detected object in the training image, a training computing capability, or complexity of the to-be-detected object, and determine a configuration parameter of i variable convolution networks based on the system parameter, where the configuration parameter includes at least one of the quantity i of the variable convolution networks, a quantity $L_i$ of variable convolution layers included in an $i^{th}$ variable convolution network, a sliding span of convolution cores of the variable convolution network, a maximum offset distance, and a size of the convolution cores, and both i and $L_i$ are integers greater than 0.

The object detection model is configured to obtain the training image, and establish the backbone network based on the training image, establish the i variable convolution networks based on a feature map output by the backbone network and the configuration parameter, where an offset distance when a convolution core of each variable convolution network performs convolution does not exceed the maximum offset distance, and input a feature output by the i variable convolution networks into a classifier of the object detection model.

The activation module is configured to compare the to-be-detected object that is in the training image and that is detected by the classifier and a prior result of the training image, and activate at least one of a model parameter of a convolution core of the backbone network, model param-eters of convolution cores of the i variable convolution networks, the maximum offset distance, and a parameter of the classifier based on the comparison result.

In a possible implementation, the object detection model is configured to offset, in any direction, a convolution sheet of a convolution core of a first variable convolution layer in the i variable convolution networks by a quantity of features, where the quantity does not exceed the maximum offset distance, and perform convolution on a model parameter of the convolution sheet of the convolution core of the first variable convolution layer and a feature that is of the first variable convolution layer and that is corresponding to a convolution sheet, obtained after the offsetting, of the convolution core of the first variable convolution layer, to obtain a feature of a second variable convolution layer of the i variable convolution networks.

In a possible implementation, the object detection model is configured to offset, in any direction, a convolution point in a convolution core of a third variable convolution layer in the i variable convolution networks by a quantity of features, where the quantity does not exceed the maximum offset distance, and perform convolution on a model parameter of the convolution point in the convolution core of the third variable convolution layer and a feature that is of the third variable convolution layer and that is corresponding to a convolution point, obtained after the offsetting, of the convolution core of the third variable convolution layer, to obtain a feature in a fourth variable convolution layer of the i variable convolution networks.

In a possible implementation, the object detection model is configured to divide the feature map output by the backbone network into i parts, where the i parts respectively serve as an initial variable convolution layer of the i variable convolution networks.

A third aspect of this application provides a computing device system. The computing device system includes at least one computing device. Each computing device includes a processor and a memory. The processor of the at least one computing device is configured to access code in the memory to perform the method provided in any one of the first aspect or the possible implementations of the first aspect.

A fourth aspect of this application provides a non-transient readable storage medium. When the non-transient readable storage medium is executed by at least one computing device, the at least one computing device performs the method provided in any one of the first aspect or the possible implementations of the first aspect. The storage medium stores a program. A type of the storage medium includes but is not limited to a volatile memory, such as a random-access memory (RAM), or a non-volatile memory, such as a flash memory, a hard disk drive (HDD), and a solid-state drive (SSD).

A fifth aspect of this application provides a computing device program product. When the computing device program product is executed by at least one computing device, the at least one computing device performs the method provided in any one of the first aspect or the possible implementations of the first aspect. The computer program product may be a software installation package, and when the method provided in any one of the first aspect or the possible implementations of the first aspect needs to be used, the computer program product may be downloaded, and the computer program product may be executed on a computing device.

BRIEF DESCRIPTION OF DRAWINGS

To describe the technical solutions in some of the embodiments of this application more clearly, the following briefly describes the accompanying drawings for the embodiments.

DESCRIPTION OF EMBODIMENTS

The following describes the technical solutions in the embodiments of this application with reference to the accompanying drawings in the embodiments of this application.

In this application, there is no logical or time-sequential dependency among "first", "second", and "n$^{th}$".

Figure 1:
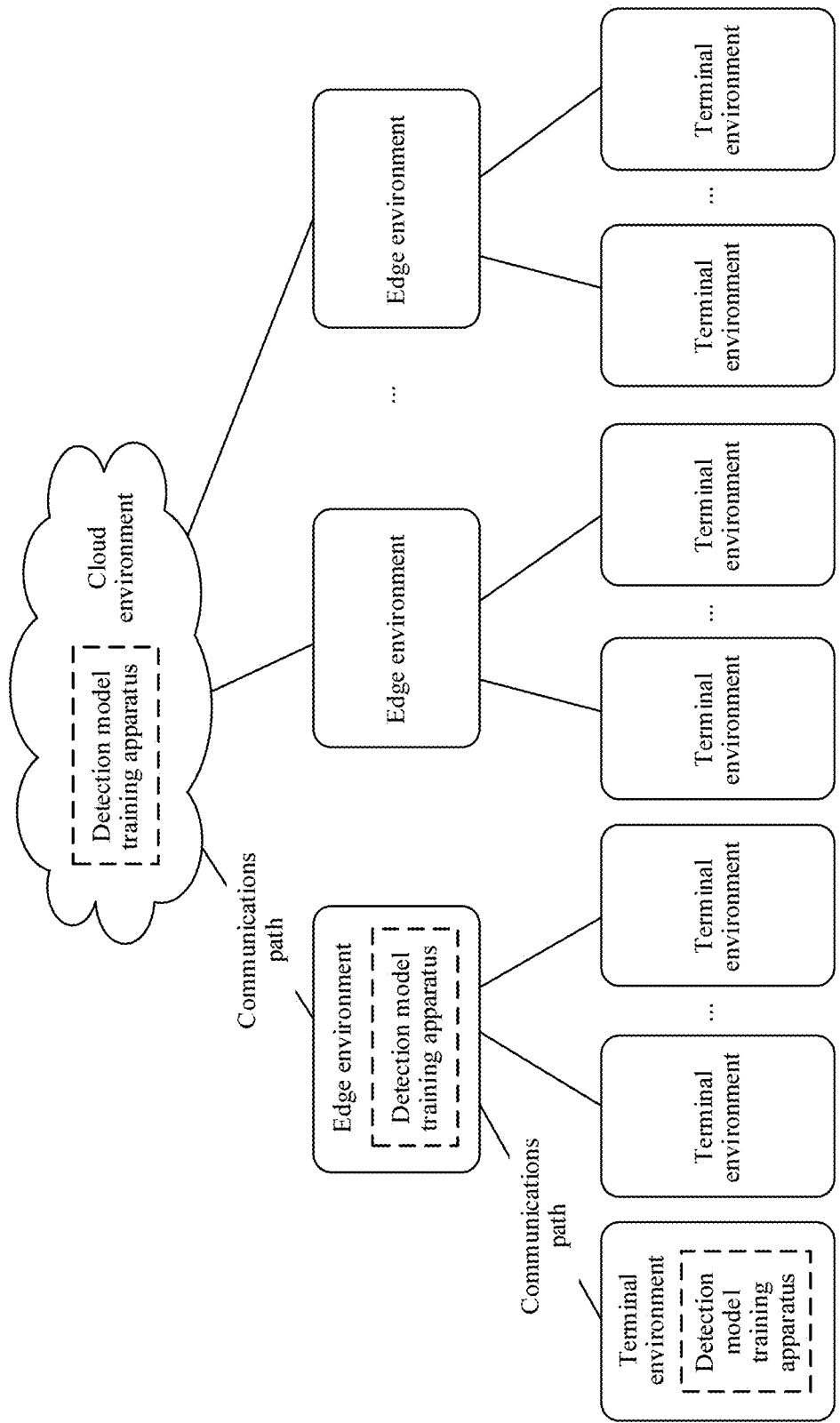
FIG. 1 is a schematic diagram of a system architecture according to this application.

As shown in FIG. 1, an object detection model training method provided in this application is performed by a detection model training apparatus. The apparatus may run in a cloud environment, and runs on one or more computing devices in the cloud environment. The apparatus may alternatively run in an edge environment, and runs on one or more computing devices (edge computing devices) in the edge environment. The apparatus may alternatively run in a terminal environment, and runs on one or more terminal devices in the terminal environment. The terminal device may be a mobile phone, a notebook, a server, a desktop computer, or the like. The edge computing device may be a server.

Figure 2:
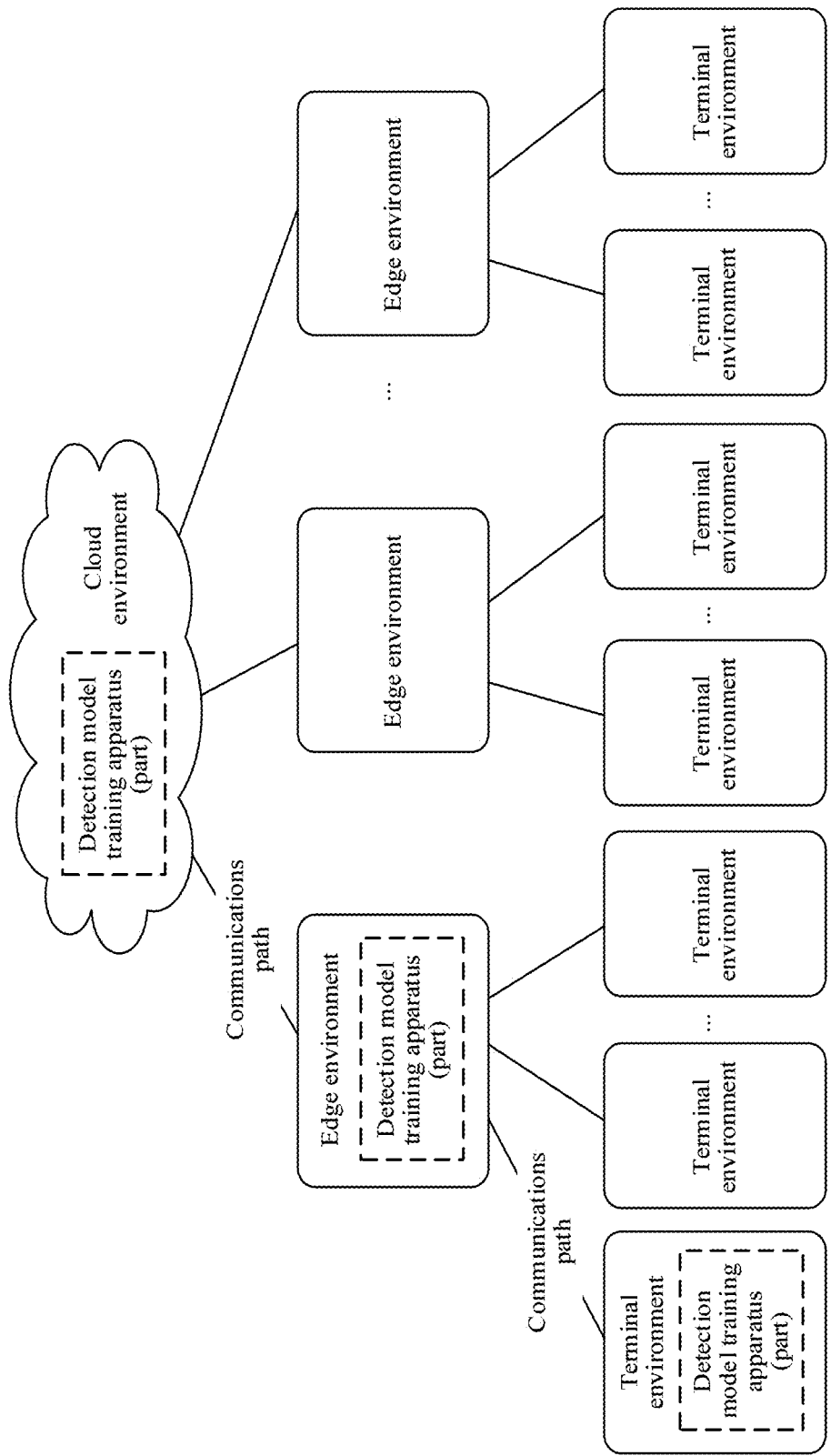
FIG. 2 is a schematic diagram of another system architecture according to this application.

As shown in FIG. 2, the detection model training apparatus may include a plurality of parts (modules). Parts of the detection model training apparatus may alternatively be deployed in different environments separately. For example, some modules of the detection model training apparatus may be deployed in three environments: the cloud environment, the edge environment, and the terminal environment, or any two of the three environments.

Figure 3:
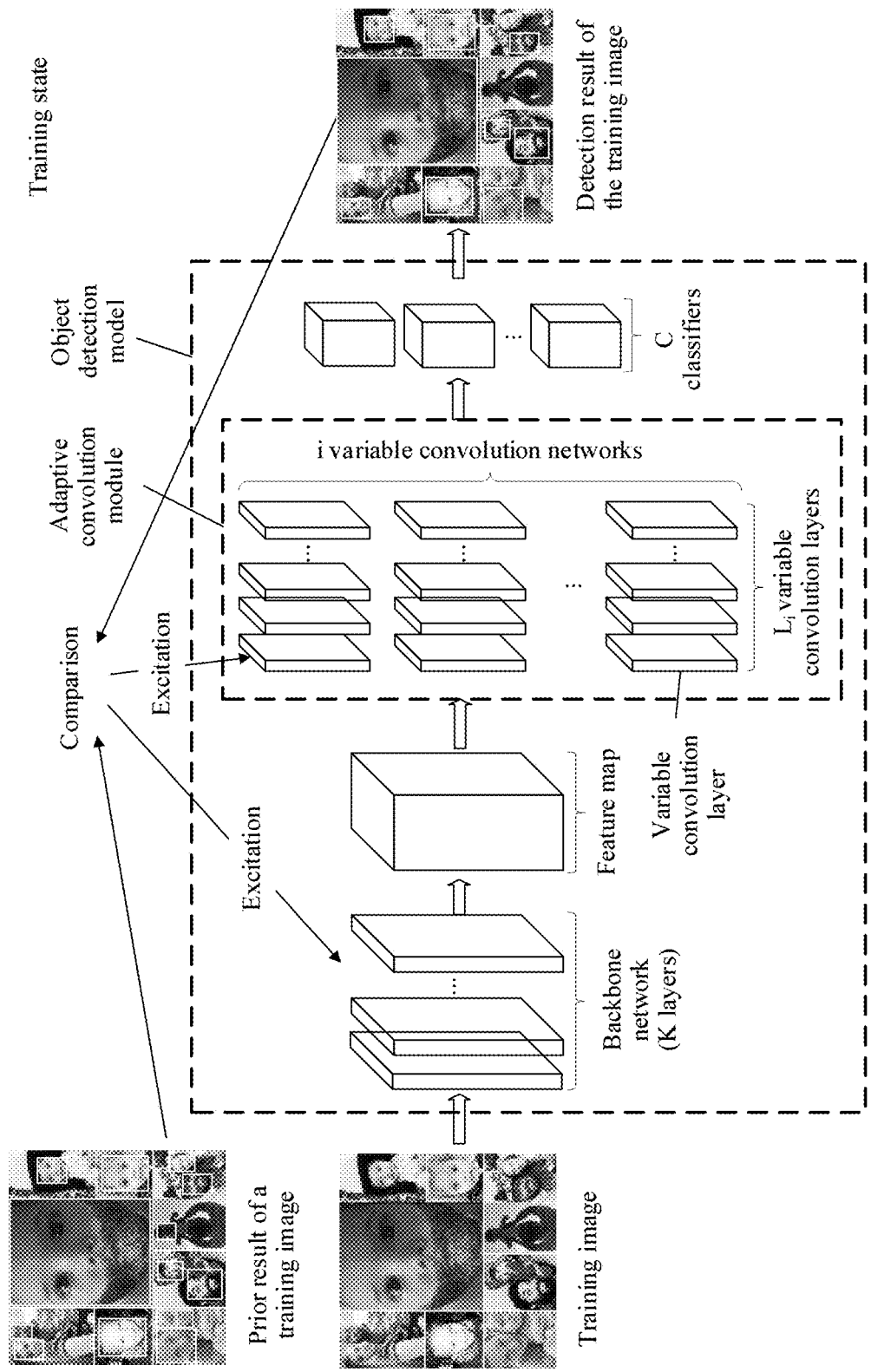
FIG. 3 is a working flowchart of a detection model training apparatus in a training state according to this application.

FIG. 3 is a schematic flowchart of working of a detection model training apparatus. In FIG. 3, the detection model training apparatus works in a training state, and the training state is to train an object detection model with relatively high precision using a training image and a prior result of the training image. The prior result of the training image includes a mark of a to-be-detected object in the training image. The training image in FIG. 3 is used as an example. The training image includes a plurality of human faces, and each face in the training image is marked with a white frame (as shown in the upper left corner of FIG. 3) in the prior result of the training image. The prior result of the training image may be generally provided manually.

A K-layer backbone network is established using the training image. The backbone network includes K convolution layers, and K is a positive integer greater than 0. The backbone network extracts a feature map from the training image. The feature map extracted by the backbone network is divided into i feature submaps, and each of the i feature submaps is used to establish one variable convolution network. Therefore, there are total i variable convolution networks, and i is a positive integer greater than 0. The i variable convolution networks constitute an adaptive convolution module. An i$^{th}$ variable convolution network includes $L_i$ variable convolution layers, and $L_i$ is a positive integer greater than 0. Each variable convolution network processes one feature submap, and outputs a processed feature submap obtained after processing the feature submap. i processed feature submaps are input into at least one classifier. There are C classifiers, and C is a positive integer greater than 0. When C is greater than 1, classifiers may focus on detecting to-be-detected objects of different sizes. The classifier can detect the to-be-detected object in the training image based on an input feature. As shown on the right side of FIG. 3, the classifier marks a detected face area on the training image using a white frame. A difference between a to-be-detected object currently detected by the detection model training apparatus and the prior result may be learned by comparing a detection result of the training image and the prior result of the training image. As shown in FIG. 3, some faces in the prior result are not detected by the detection model training apparatus. Each parameter of the object detection model is activated based on the difference, and the parameter includes at least one of a model parameter of a convolution core of each convolution layer of the backbone network, a model parameter of a convolution core of a variable convolution layer of any variable convolution network, a maximum offset distance of a convolution sheet/convolution point of a variable convolution layer of any variable convolution network, and a parameter of the classifier. A difference between a detection result of each training image and a prior result of the training image activates each parameter of the object detection model. Therefore, after the object detection model is activated by a large quantity of training images, precision of the object detection model is improved.

The detection model training apparatus trains the object detection model using a large quantity of training images and prior results of the training images. The object detection model includes a backbone network, i variable convolution networks (adaptive convolution modules), and C classifiers. The trained object detection model is used in an inference state. The trained object detection model may be deployed in a cloud environment, an edge environment, or a terminal environment. Alternatively, a part of the object detection model may be deployed in three or any two of a cloud environment, an edge environment, and a terminal environment.

Figure 4:
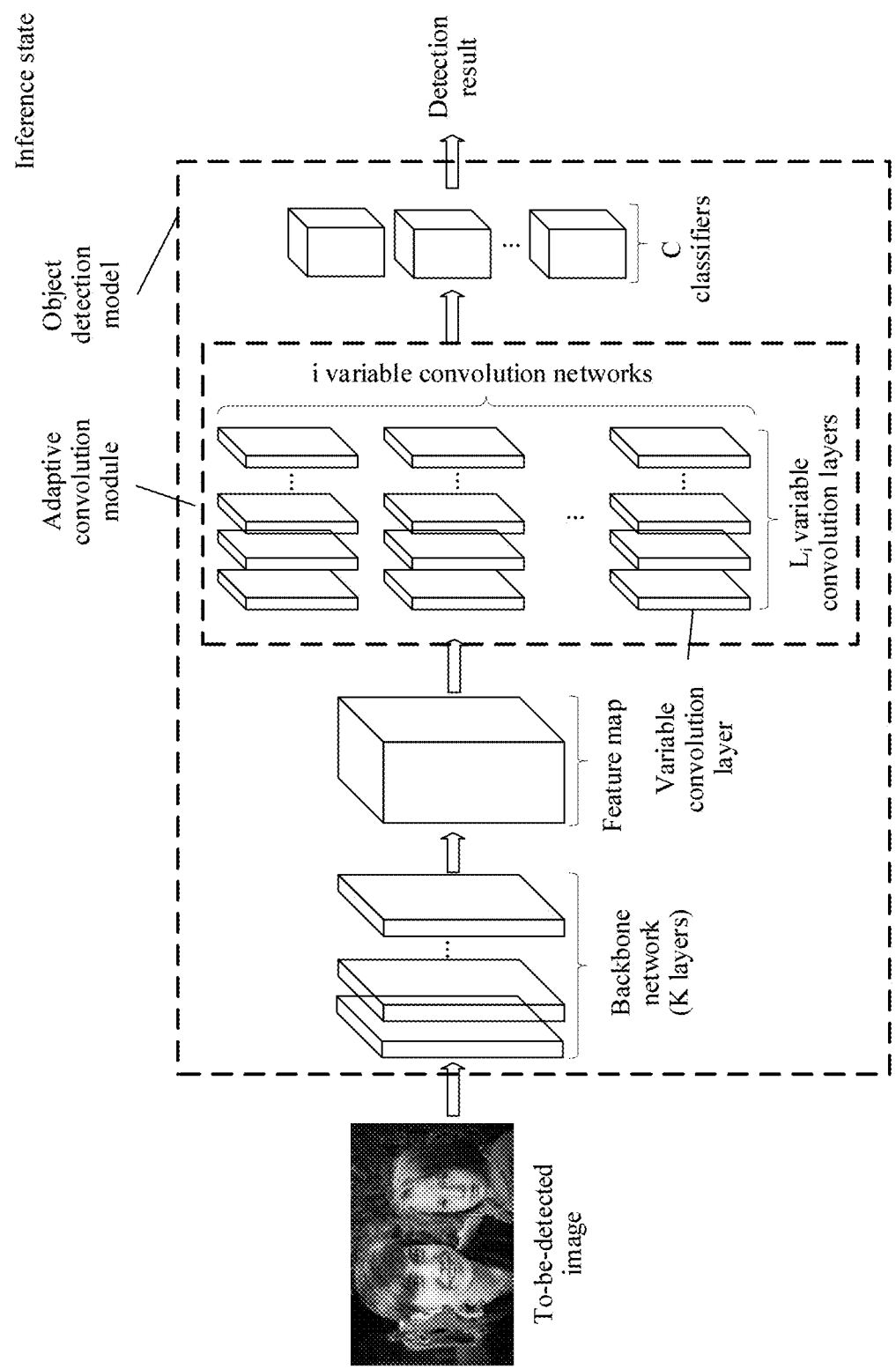
FIG. 4 is a working flowchart of object detection model in an inference state according to this application.

As shown in FIG. 4, in the inference state, after the to-be-detected image is input into the backbone network of the object detection model, and is processed by the i variable convolution networks and the C classifiers, the object detection model outputs a detection result of the to-be-detected image. Generally, the detection result includes information such as a location of a detected to-be-detected object and a quantity of detected to-be-detected objects, for example, a quantity of faces and a location of each face.

The following describes concepts used in this application.

Backbone Network:

The backbone network includes a convolution network, and the convolution network includes K convolution layers. In addition to the convolution network, the backbone network may further include a pooling module. Optionally, the backbone network may use some commonly used templates in the industry, such as Vgg, Resnet, Densenet, Xception, Inception, and Mobilenet. A feature extracted from the training image is used as a first convolution layer of the backbone network. A feature extracted from the first convolution layer of the backbone network by a convolution core corresponding to the first convolution layer constitutes a second convolution layer of the backbone network. A feature extracted from the second convolution layer of the backbone network by a convolution core corresponding to the second convolution layer of the backbone network constitutes a third convolution layer of the backbone network. By analogy, a feature extracted from a $(k-1)^{th}$ convolution layer of the backbone network by a convolution core corresponding to the $(k-1)^{th}$ convolution layer of the backbone network constitutes a $k^{th}$ convolution layer of the backbone network, and k is greater than or equal to 1 and less than or equal to K. A feature extracted from the $K^{th}$ convolution layer of the backbone network by a convolution core corresponding to the $K^{th}$ convolution layer of the backbone network constitutes a first variable convolution layer of a variable convolution network. The variable convolution network includes $L_i$ variable convolution layers. Similar to the backbone network, a feature extracted from a $(k-1)^{th}$ convolution layer of the variable convolution network by a convolution core corresponding to the $(k-1)^{th}$ convolution layer of the variable convolution network constitutes a $k^{th}$ variable convolution layer of the variable convolution network, where k is greater than or equal to 1 and is less than or equal to $L_i-1$.

Figure 5:
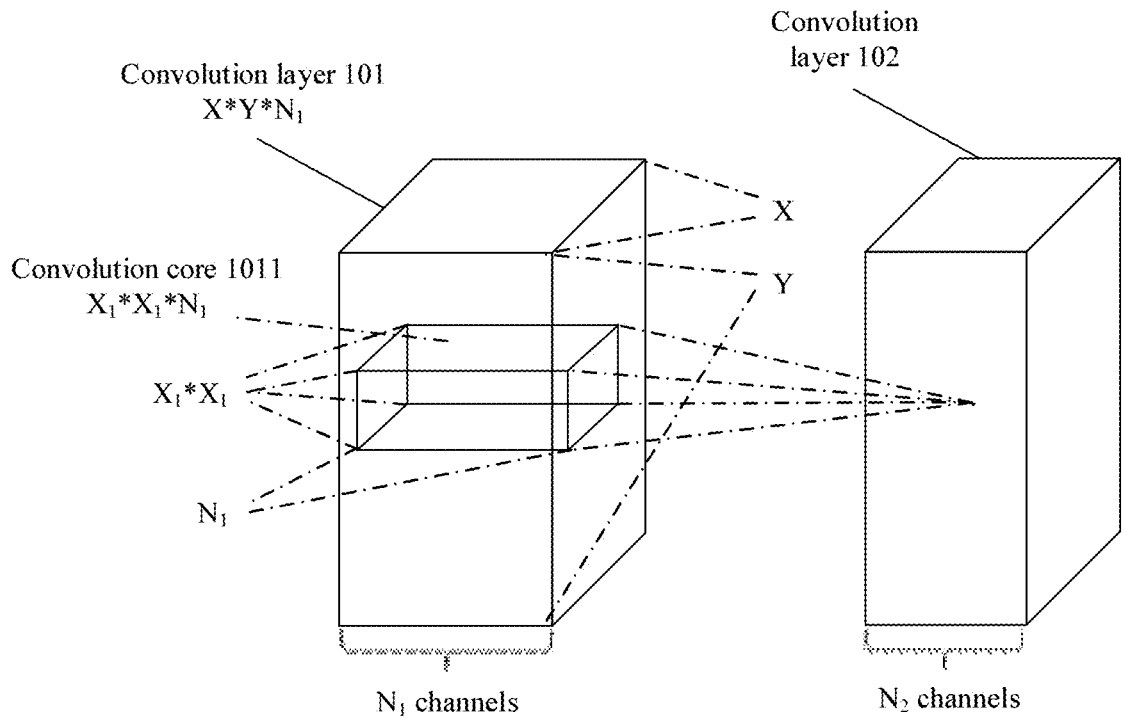
FIG. 5 is a schematic structural diagram of a convolution layer and a convolution core according to this application.

Convolution Layer and Convolution Core:

Both the backbone network and each variable convolution network include at least one convolution layer. As shown in FIG. 5, a size of a convolution layer 101 is $X*Y*N_1$, to be specific, the convolution layer 101 includes $X*Y*N_1$ features. $N_1$ represents a quantity of channels, one channel is one feature dimension, and $X*Y$ represents a quantity of features included by each channel. X, Y, and $N_1$ are all positive integers greater than 0.

A convolution core 1011 is one of convolution cores used to act on the convolution layer 101. Because a convolution layer 102 includes $N_2$ channels, the convolution layer 101 uses $N_2$ convolution cores in total. Sizes and model parameters of the $N_2$ convolution cores may be the same or different. The convolution core 1011 is used as an example, and a size of the convolution core 1011 is $X_1*X_1*N_1$. To be specific, the convolution core 1011 includes $X_1*X*N_1$ model parameters. An initialization model parameter in the convolution core may use a model parameter template commonly used in the industry. When the convolution core 1011 slides on the convolution layer 101 and slides on a position of the convolution layer 101, a model parameter of the convolution core 1011 is multiplied by a feature of the convolution layer 101 at the corresponding position. After product results of model parameters of the convolution core 1011 and the feature of the convolution layer 101 at the corresponding position are combined, one feature on one channel of the convolution layer 102 is obtained. A product result of the feature of the convolution layer 101 and the convolution core 1011 may be directly used as a feature of the convolution layer 102. Alternatively, after the feature of the convolution layer 101 and the convolution core 1011 slide on the convolution layer 101 and all product results are output, all the product results are normalized, and normalized product results are used as the feature of the convolution layer 102.

In vivid representation, the convolution core 1011 slides on the convolution layer 101 for convolution, and a convolution result constitutes a channel of the convolution layer 102. Each convolution core used by the convolution layer 101 is corresponding to one channel of the convolution layer 102. Therefore, a quantity of channels of the convolution layer 102 is equal to a quantity of convolution cores acting on the convolution layer 101. A design of a model parameter in each convolution core embodies a characteristic of a feature that the convolution core expects to extract from a convolution layer. Features of the $N_2$ channels are extracted from the convolution layer 101 using the $N_2$ convolution cores.

Figure 6:
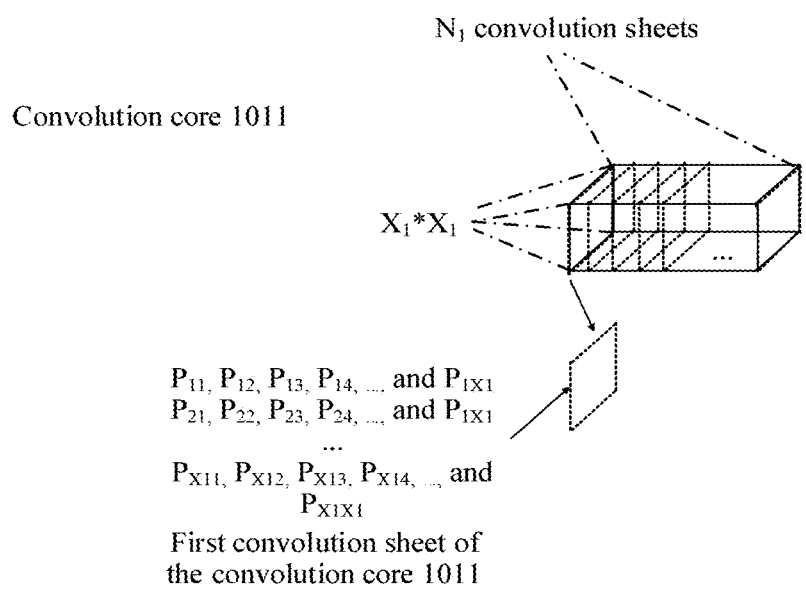
FIG. 6 is a schematic structural diagram of a convolution sheet according to this application.

As shown in FIG. 6, the convolution core 1011 is divided. The convolution core 1011 includes $N_1$ convolution sheets, and each convolution sheet includes $X_1*X_1$ model parameters ($P_{11}$ to $Px_1x_1$). Each model parameter corresponds to one convolution point. A model parameter corresponding to one convolution point is multiplied by a feature in a convolution layer at a corresponding position of the convolution point to obtain a convolution result of the convolution point, and a sum of convolution results of convolution points of one convolution core is a convolution result of the convolution core.

Sliding Span of the Convolution Core:

The sliding span of the convolution core is a quantity of features of each sliding span of the convolution core on the convolution layer. After the convolution core completes convolution at a current position of a current convolution layer to constitute a feature of a next convolution layer, the convolution core slides by V features on the basis of the current position of the current convolution layer, and performs convolution on a model parameter of the convolution core and a feature of the convolution layer at a position after the sliding, where V is the sliding span of the convolution core.

Figure 7:
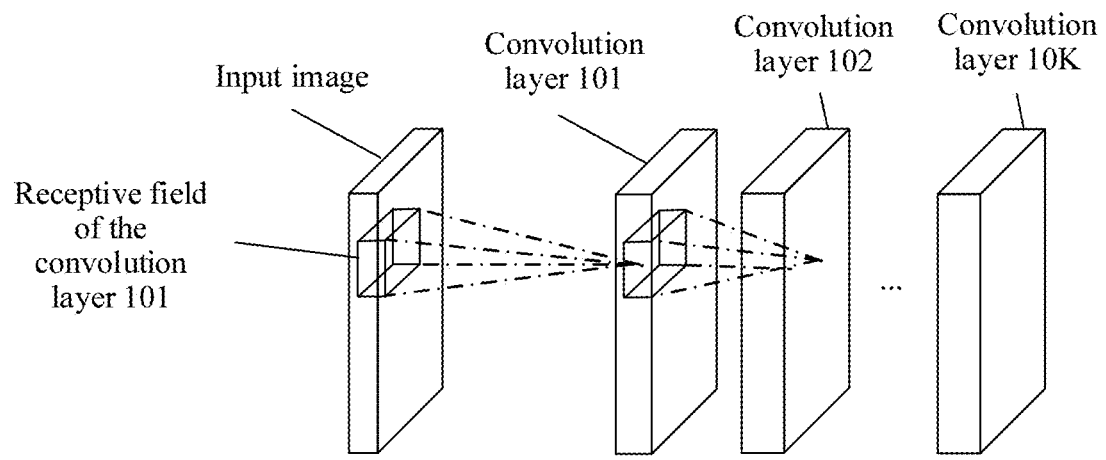
FIG. 7 is a schematic diagram of a receptive field of a convolution layer according to this application.

Receptive Field:

The receptive field is a perception domain (perception range) of a feature on a convolution layer on an input image. If a pixel in the perception range changes, a value of the feature changes accordingly. As shown in FIG. 7, the convolution core slides on the input image, and an extracted feature constitutes the convolution layer 101. Similarly, the convolution core slides on the convolution layer 101, and an extracted feature constitutes the convolution layer 102. In this case, each feature in the convolution layer 101 is extracted from a pixel of the input image in a size of a convolution sheet of the convolution core that slides on the input image, and the size is a receptive field of the convolution layer 101. Therefore, the receptive field of the convolution layer 101 is shown in FIG. 7.

Figure 8:
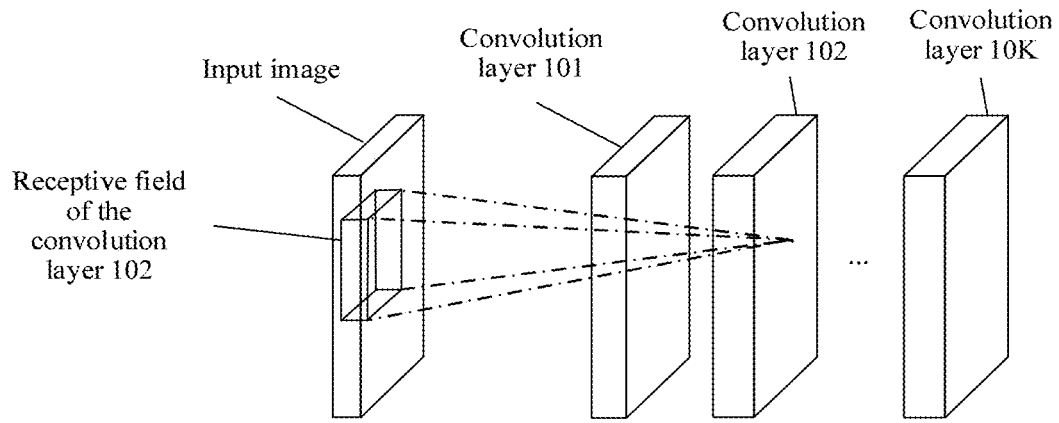
FIG. 8 is a schematic diagram of a receptive field of another convolution layer according to this application.

Accordingly, each feature in the convolution layer 102 is mapped to a range on an input image (to be specific, a pixel with a specific range on the input image), that is, a receptive field of the convolution layer 102. As shown in FIG. 8, each feature in the convolution layer 102 is extracted from a pixel of the input image in a size of a convolution sheet of the convolution core that slides on the convolution layer 101. Each feature on the convolution layer 101 is extracted from a pixel of the input image in a range of a convolution sheet of the convolution core that slides on the input image. Therefore, the receptive field of the convolution core 102 is greater than the receptive field of the convolution layer 101. If a convolution network (the backbone network or the variable convolution network) includes a plurality of convolution layers, a receptive field of a last convolution layer in the plurality of convolution layers is a receptive field of the convolution network.

Training Computing Capability:

The training computing capability is a computing capability that can be used by the detection model training apparatus in an environment in which the detection model training apparatus is deployed, and includes at least one of a processor frequency, processor occupancy, a memory size, memory occupancy, cache utilization, a cache size, an image processor frequency, image processor occupancy, and another computing resource parameter. When parts of the detection model training apparatus are deployed in a plurality of environments, the training computing capability may be obtained by comprehensively calculating a computing capability that can be used by the detection model training apparatus in the plurality of environments. The training computing capability is mainly used to calculate a configuration parameter of an adaptive convolution module. Therefore, when the parts of the detection model training apparatus are deployed in different environments, the training computing capability may be obtained using a computing capability that can be used by the adaptive convolution module in an environment in which the adaptive convolution module is deployed.

Figure 9:
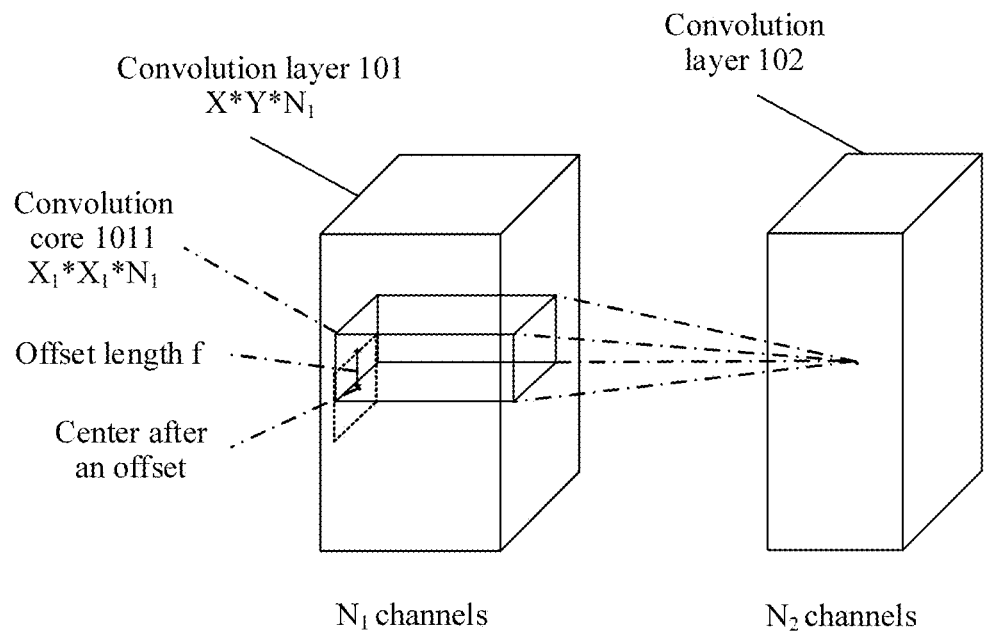
FIG. 9 is a schematic diagram of an offset of a convolution sheet according to this application.
Figure 12:
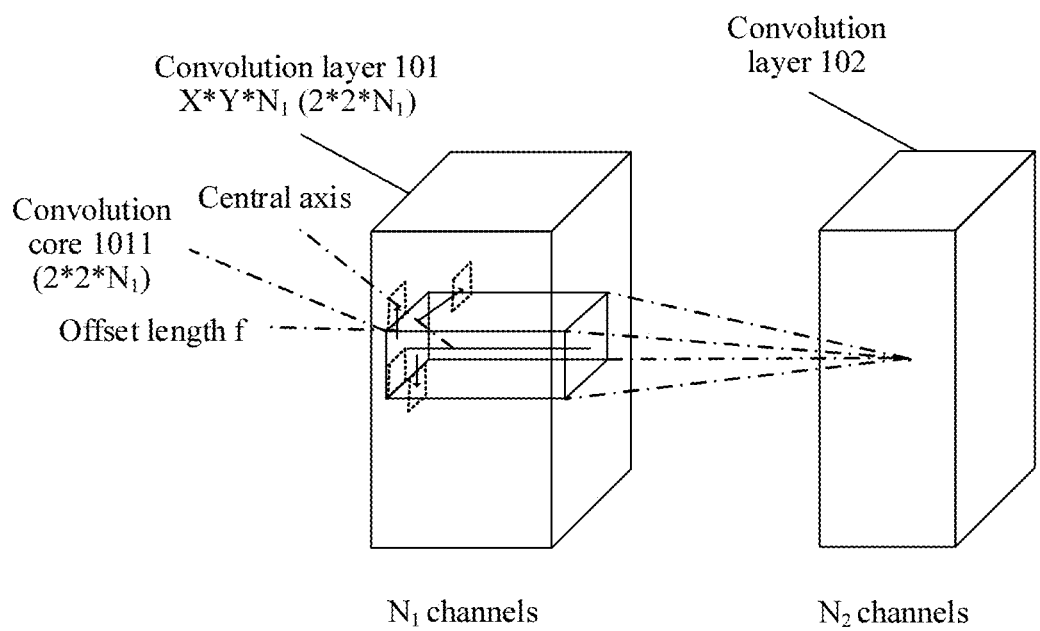
FIG. 12 is a schematic diagram of an offset of a plurality of convolution points according to this application.

Maximum Offset Distance and Offset Distance:

The maximum offset distance has two definitions. One is a maximum offset distance of a center of a convolution sheet relative to a center axis of a convolution core. Because the center of the convolution sheet is a part of the central axis of the convolution core, the maximum offset distance is a maximum offset distance of a center of the offset convolution sheet relative to a center of an original position of the convolution sheet. The other is a maximum offset distance of each convolution point in a convolution core relative to an original position of the convolution point. Accordingly, the offset distance also has two definitions. One is a distance between a center of the offset convolution sheet and a central axis of the convolution core, that is, an offset distance of the center of the offset convolution sheet relative to the central axis of the convolution core. As shown in FIG. 9, an offset distance of one convolution sheet of the convolution core 1011 relative to a central axis of the convolution core 1011 is f (f features). The other is a distance between an offset convolution point and an original position of the convolution point, that is, an offset distance of the offset convolution point relative to the original position of the convolution point. As shown in FIG. 12, an offset distance of one convolution point in the convolution core 1011 relative to an original position of the convolution point is f (f features, and f in FIG. 12 is equal to 0, 1 or 2).

The convolution core 1011 (which is represented by a solid line in FIG. 9 to FIG. 12) is generally of a cuboid or a cube. When the convolution core 1011 slides on the convolution layer 101 and slides to a position of the convolution layer 101, the central axis of the convolution core 1011 is constituted by convolution points in centers of all original convolution sheets (convolution sheets that have not been offset) of the convolution core 1011. However, actually, what is convoluted with a model parameter in the convolution core 1011 may not be entirely a feature of the convolution layer 101 within a range of an original convolution sheet.

Figure 10:
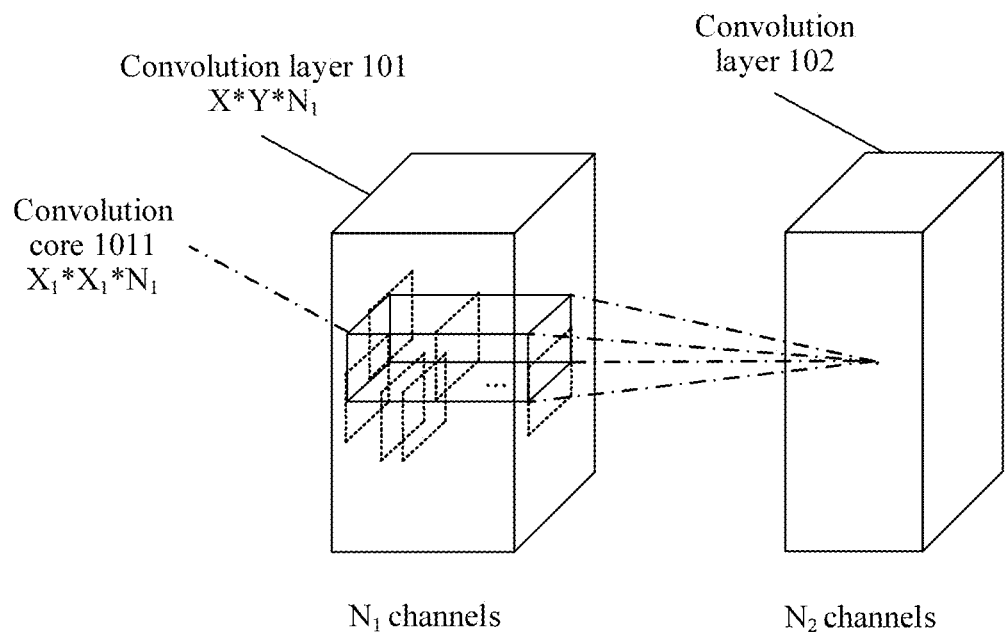
FIG. 10 is a schematic diagram of an offset of a plurality of convolution sheets according to this application.

When a convolution sheet is offset, each original convolution sheet of the convolution core 1011 may be offset, using the center axis as a center, in any direction by at most a quantity of features, where the quantity does not exceed the maximum offset distance, and a model parameter of the convolution sheet is convoluted with a feature of the convolution layer 101 included in a location area of the offset convolution sheet. In this way, as shown in FIG. 10, although the model parameter of the convolution core 1011 does not change, a convolution object of the convolution core 1011 is no longer a feature in a cuboid or a cube in the convolution layer 101, but is a feature within a range of a series of wave-shaped convolution sheets that are offset in each direction of the central axis of the convolution core 1011. The convolution sheet is offset around the central axis of the convolution core such that the convolution core can more effectively extract a feature in a distorted and deformed range, the convolution core is more sensitive to detection precision of a to-be-detected object that is distorted and deformed, a training effect of an object recognition model is improved, precision of object recognition performed by the object recognition model obtained by training is improved, and robustness of the object recognition model for a to-be-detected object that is distorted and deformed is improved.

Figure 11:
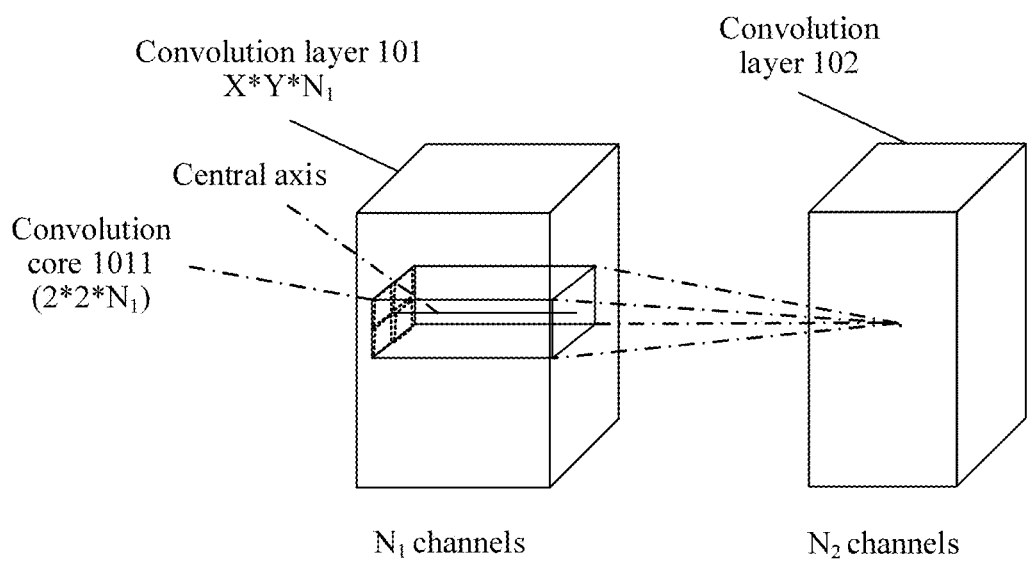
FIG. 11 is a schematic diagram of a convolution point according to this application.

When a convolution point is offset, each original convolution point of an original convolution sheet of the convolution core 1011 may be offset, using an original position of the convolution point as a center, in any direction by at most a quantity of features, where the quantity does not exceed the maximum offset distance, and a model parameter of the convolution point is convoluted with a feature of the convolution layer 101 corresponding to a position after the offsetting. As shown in FIG. 11, a size of the convolution core 1011 is $2*2*N_1$, to be specific, each convolution sheet includes 2*2 convolution points. Each convolution point is represented by a dashed rectangle. For example, as shown in FIG. 12, a convolution point in the upper left corner of a first convolution sheet of the convolution core 1011 is offset upward by one feature, a convolution point in the upper right corner is offset rightward by two features, a convolution point in the lower left corner is not offset, and a convolution point in the lower right corner is offset downward by one feature. A model parameter corresponding to a convolution point is multiplied by a feature corresponding to the convolution layer 101 at a position of the convolution point after the offsetting. After a product corresponding to each convolution point in one convolution sheet is completed, a convolution point in a next convolution sheet is processed. After a product operation is performed on a model parameter corresponding to each convolution point in the convolution core 1011 and a feature corresponding to the convolution layer 101 at a position of the convolution point after the offsetting, a set of these product results is a convolution result of the convolution core 1011. As shown in FIG. 12, although the model parameter of the convolution core 1011 does not change, a convolution object of the convolution core 1011 is no longer a feature in a cuboid or a cube in the convolution layer 101, but is a feature corresponding to a position of a series of discretely distributed convolution points that are offset in each direction of the convolution core 1011. The convolution point is randomly offset around an original position such that the convolution core can more effectively extract a feature in a distorted and deformed range, the convolution core is more sensitive to detection precision of a to-be-detected object that is distorted and deformed, a training effect of an object recognition model is improved, precision of object recognition performed by the object recognition model obtained by training is improved, and robustness of the object recognition model for a to-be-detected object that is distorted and deformed is improved.

Figure 13:
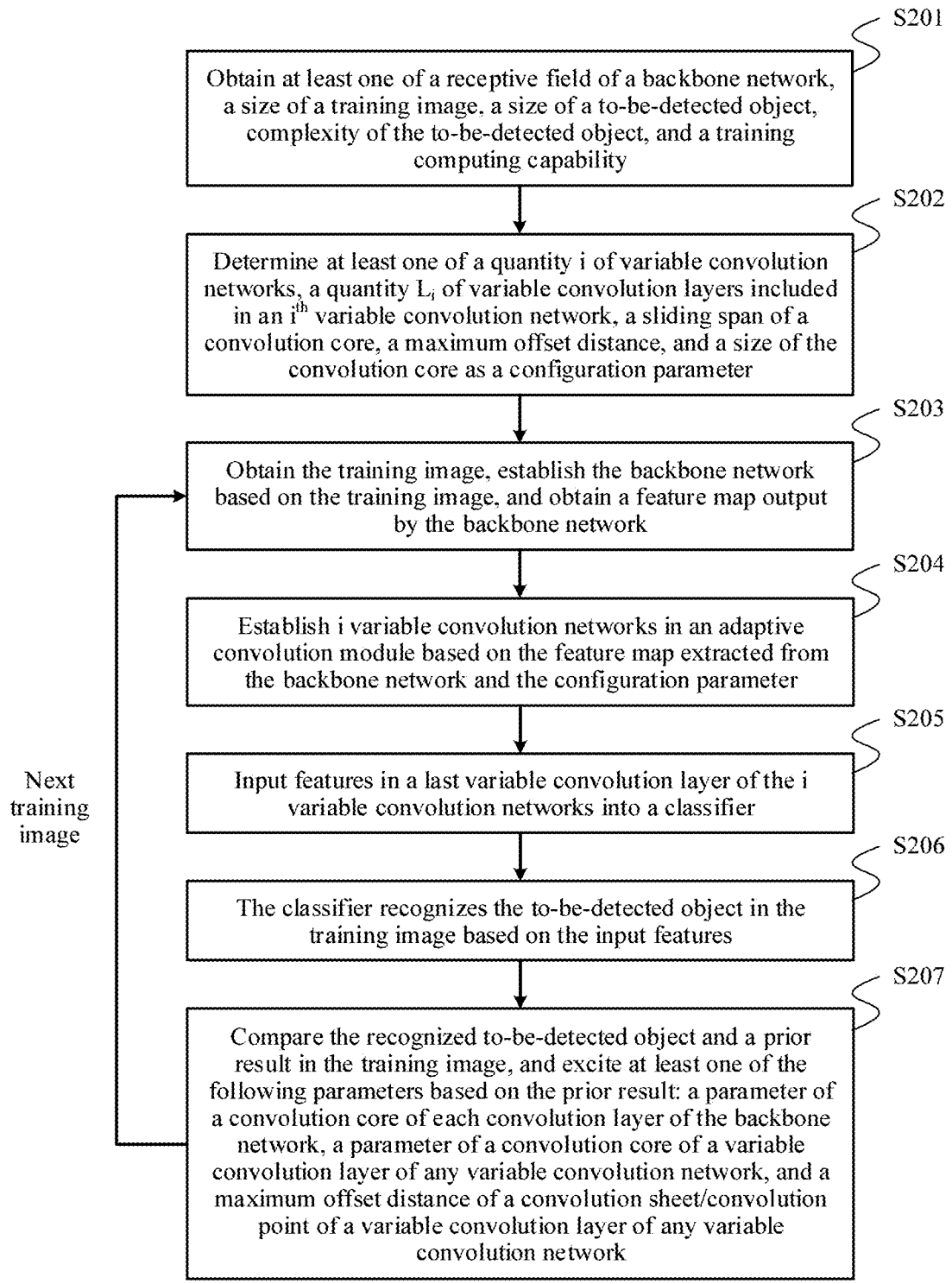
FIG. 13 is a schematic flowchart of a method according to this application.

As shown in FIG. 13, a working process of a detection model training apparatus is described.

S201. Obtain at least one of the following system parameters: a receptive field of a backbone network, a size of a training image, a size of a to-be-detected object, a training computing capability, or complexity of the to-be-detected object.

The size of the to-be-detected object and the complexity of the to-be-detected object may be manually input into the detection model training apparatus. Sizes of different training images and sizes of different to-be-detected objects may be different. In an optional solution, in this case, an average value of sizes of all training images may be used as the size of the training image, and an average value of sizes of to-be-detected objects in all the training images may be used as the size of the to-be-detected object.

The complexity of the to-be-detected object indicates difficulty in recognizing the to-be-detected object, for example, a quantity of to-be-detected objects (an average quantity of to-be-detected objects in each to-be-detected image), and whether reflected light of the to-be-detected object is balanced. The complexity of the to-be-detected object further includes a degree of deformation of the to-be-detected object. The degree of deformation of the to-be-detected object indicates a degree of deformation, distortion, and obstruction of the to-be-detected object. A greater degree of deformation, distortion, and obstruction of the to-be-detected object in the to-be-detected image indicates higher complexity of the to-be-detected object.

The foregoing system parameters may be obtained for a plurality of times, and do not need to be obtained in a same step. The foregoing system parameters do not need to be all obtained. A specific obtained system parameter is determined based on a system parameter that needs to be used in a subsequent step of determining a configuration parameter. Each system parameter may be obtained before a subsequent step in which the system parameter is used.

S202. Determine at least one of the following configuration parameters based on the system parameter obtained in S201. The configuration parameter is used to establish an i-row $L_i$-column variable convolution network in FIG. 3. The configuration parameter includes i, $L_i$ (quantities of variable convolution layers included in variable convolution networks may be the same or different), a sliding span of a convolution core, a maximum offset distance, and a size of the convolution core.

The foregoing configuration parameters may be determined for a plurality of times, and do not need to be determined in a same step. The foregoing configuration parameters do not need to be all determined, and a configuration parameter used in a subsequent process of establishing an adaptive convolution module needs to be determined in S202. Some configuration parameters required in a subsequent process of establishing the adaptive convolution module may have been manually set, and these configuration parameters manually set do not need to be determined in S202.

i may be determined by the training computing capability and the complexity of the to-be-detected object. Generally, a stronger training computing capability indicates a larger quantity of computing resources that can be used for training. A feature map output by the backbone network may be divided into more feature submaps, and a corresponding value of i increases. Higher complexity of the to-be-detected object makes it more difficult to detect the to-be-detected object, and the value of i needs to be greater to ensure detection precision of a trained model. When the value of i is greater, the feature map output by the backbone network is divided into more variable convolution networks such that a feature in the feature map can be better reconstructed, and quality of the feature finally output by the adaptive convolution module is improved. If the value of i is excessively great, a required training computing capability may not support running of the detection model training apparatus. i obtained based on the foregoing system parameters can balance the training computing capability and precision of the detection model training apparatus.

$L_i$ may be determined by the receptive field of the backbone network, the size of the training image, and the size of the to-be-detected object. Generally, a smaller ratio of the receptive field of the backbone network to the size of the to-be-detected object indicates that the receptive field of the backbone network may not be enough to cover to-be-detected objects of various sizes. Therefore, a larger value of $L_i$ is used to expand the receptive field by setting more variable convolution layers in any variable convolution network. On the contrary, a larger ratio of the receptive field of the backbone network to the size of the to-be-detected object indicates that the receptive field of the backbone network is enough to cover a to-be-detected object of a large size. Therefore, a smaller value of $L_i$ indicates that a quantity of variable convolution layers does not need to be set to too larger. A larger size of the training image indicates a larger size of a to-be-detected object in a general image, and a value of $L_i$ is larger. A smaller size of the training image indicates a smaller size of a to-be-detected object in a general image, and a value of $L_i$ is smaller. Selection of an appropriate value of $L_i$ improves precision of a trained object detection model.

The maximum offset distance may be determined by the complexity of the to-be-detected object. Generally, higher complexity of the to-be-detected object indicates a larger offset length that is required for a convolution sheet and a convolution point and a larger required maximum offset distance. Generally, lower complexity of the to-be-detected object indicates a smaller required maximum offset distance. Selection of an appropriate maximum offset distance improves precision of a trained object detection model.

The sliding span of the convolution core may be determined by the training computing capability. A stronger training computing capability indicates more computing resources that can be used to train the object detection module and indicates a smaller determined sliding span of the convolution core in order to ensure that a next variable convolution layer can be constructed by extracting a feature from a current variable convolution layer with a finer granularity. Selection of an appropriate sliding span of the convolution core improves precision of a trained object detection model.

The size of the convolution core may be determined by the training computing capability, the size of the training image, and the size of the to-be-detected object. A stronger training computing capability indicates a larger size of the convolution core. A larger size of the training image and a larger size of the to-be-detected object indicate a larger size of the convolution core. Sizes of convolution cores used by all variable convolution layers may be the same or different. In different cases, there may be a plurality of sizes, obtained in S202, of the convolution core. Selection of an appropriate size of the convolution core improves precision of a trained object detection model.

The foregoing describes only an example of how each configuration parameter is obtained. An actual obtaining manner of each configuration parameter may be not limited to the foregoing rule, and any configuration parameter may be obtained using any one or more system parameters in S201, or by introducing a system parameter of another training image or a system parameter of a to-be-detected object in the training image or a system parameter of a backbone network or a running environment.

Some or all of the foregoing configuration parameters may be obtained through presetting. The detection model training apparatus pre-obtains some of configuration parameters (before S201), and some configuration parameters do not need to be determined in S202. These pre-obtained configuration parameters may be manually set by experience. Preconfiguring some configuration parameters may reduce a type of a system parameter obtained by the detection model training apparatus in S201 and an amount of calculation of the configuration parameter in S202, thereby increasing running efficiency of the detection model training apparatus.

The foregoing system parameter refers to a parameter of the training image, the to-be-detected object in the training image, the backbone network, or a training environment. Such a system parameter may be obtained before the object detection model is established. The system parameter is not affected by a model parameter or a configuration parameter. The system parameter is also referred to as a super parameter. The configuration parameter refers to a parameter required for establishing an adaptive convolution module. The configuration parameter is obtained based on the system parameter. Different system parameters may cause different configuration parameters. The model parameter refers to a parameter corresponding to each convolution point in the convolution core. The model parameter is constantly activated and changed during a training process of the object detection model.

S203. Obtain the training image, establish the backbone network based on the training image, and obtain a feature map output by the backbone network.

S204. Establish i variable convolution networks in the adaptive convolution module based on the feature map output by the backbone network and the configuration parameter determined (pre-obtained) in S202, where an $i^{th}$ variable convolution network includes $L_i$ variable convolution layers.

The feature map output by the backbone network in S204 may be a feature in a $K^{th}$ convolution layer of the backbone network, or may be a feature in another convolution layer of the backbone network. After the feature map is obtained, the feature map is divided into i parts, and each of the i parts is respectively used as a first variable convolution layer of each variable convolution network. For example, if a size of the feature map is X*X*512, and i=64, the feature map is divided into X*X*8 variable convolution layers. An $i^{th}$ variable convolution network is used as an example, and convolution is performed on a feature of a first variable convolution layer of the $i^{th}$ variable convolution network based on a convolution core of the first variable convolution layer in order to obtain a second variable convolution layer. In a convolution process, a convolution sheet/convolution point of each convolution core may be offset in any direction by a quantity of features, where the quantity does not exceed the maximum offset distance, and is multiplied by a feature of a first variable convolution layer corresponding to a position after the offsetting. A convolution operation is performed on the first variable convolution layer and a corresponding convolution core to constitute the second variable convolution layer. Similarly, a convolution operation is performed on the second variable convolution layer and a corresponding convolution core to constitute a third variable convolution layer. An $L_i^{th}$ variable convolution layer is obtained by analogy.

Because the $i^{th}$ variable convolution network includes $L_i$ variable convolution layers, the $i^{th}$ variable convolution network uses $L_i$–1 convolution cores. A size of a convolution core used by each variable convolution layer is the size, determined in S202, of the convolution core, and a model parameter in the convolution core may be preset (before S203) after the size of the convolution core is determined. A sliding span of the convolution core used by each variable convolution layer is the sliding span, determined in S202, of the convolution core. An offset distance of a center of a convolution sheet in each variable convolution layer relative to a central axis of the convolution core is not greater than the maximum offset distance determined in S202. Alternatively, an offset distance of a convolution point in each variable convolution layer relative to an original position of the convolution point is not greater than the maximum offset distance determined in S202.

S205. Input features in a last variable convolution layer of the i variable convolution networks into a classifier.

The features in the last layer of the i variable convolution networks are input into the classifier, and there may be a plurality of classifiers, and the plurality of classifiers are separately specific to to-be-detected objects of different sizes. Before the features are input into the classifier, the features in the last layer of the i variable convolution networks may be combined, normalized, or the like.

S206. The classifier recognizes a to-be-detected object in the training image based on the features input in S205.

A parameter is set in the classifier, and the classifier recognizes the to-be-detected object in the training image based on the parameter and the input features.

S207. Compare the to-be-detected object that is in the training image and that is recognized in S206 and a prior result in the training image, and activate at least one of the following parameters based on the prior result: a model parameter of a convolution core of each convolution layer of the backbone network, a model parameter of a convolution core of a variable convolution layer of any variable convolution network, a maximum offset distance of a convolution sheet/convolution point of a variable convolution layer of any variable convolution network, and the parameter of the classifier.

After S207, the training image obtained in S203 completes activation for the object detection model, the detection model training apparatus obtains a next training image, and trains the object detection model based on the next training image and a prior result of the next training image.

An activation process of the next training image is similar to an activation process of the training image obtained in S203. A main difference is as follows. 1. A model parameter, used in the feature map extracted by the backbone network from the next training image, of a convolution core of each convolution layer of the backbone network is activated in S207 (if the model parameter is activated in S207). 2. After a feature map is extracted by the backbone network from the next training image, a model parameter, used in a process of extracting a feature that is input into the classifier and that is extracted by the i variable convolution networks from the feature map, of a convolution core of each variable convolution layer is activated in S207 (if the model parameter is activated in S207). 3. After the feature map is extracted by the backbone network from the next training image, a maximum offset distance, used in a process of extracting a feature that is input into the classifier and that is extracted by the i variable convolution networks from the feature map, of a convolution sheet/convolution point is activated in S207 (if the maximum offset distance is activated in S207). 4. A feature of the classifier experienced by the next training image is activated in S207 (if the feature is activated in S207).

By analogy, the object detection model is further activated using each training image on the basis of activation performed using a previous training image. After all training images are sequentially used for training the object detection model, a training process of the object detection model ends. As shown in FIG. 3, the object detection model may be used in an inference state.

Figure 14:
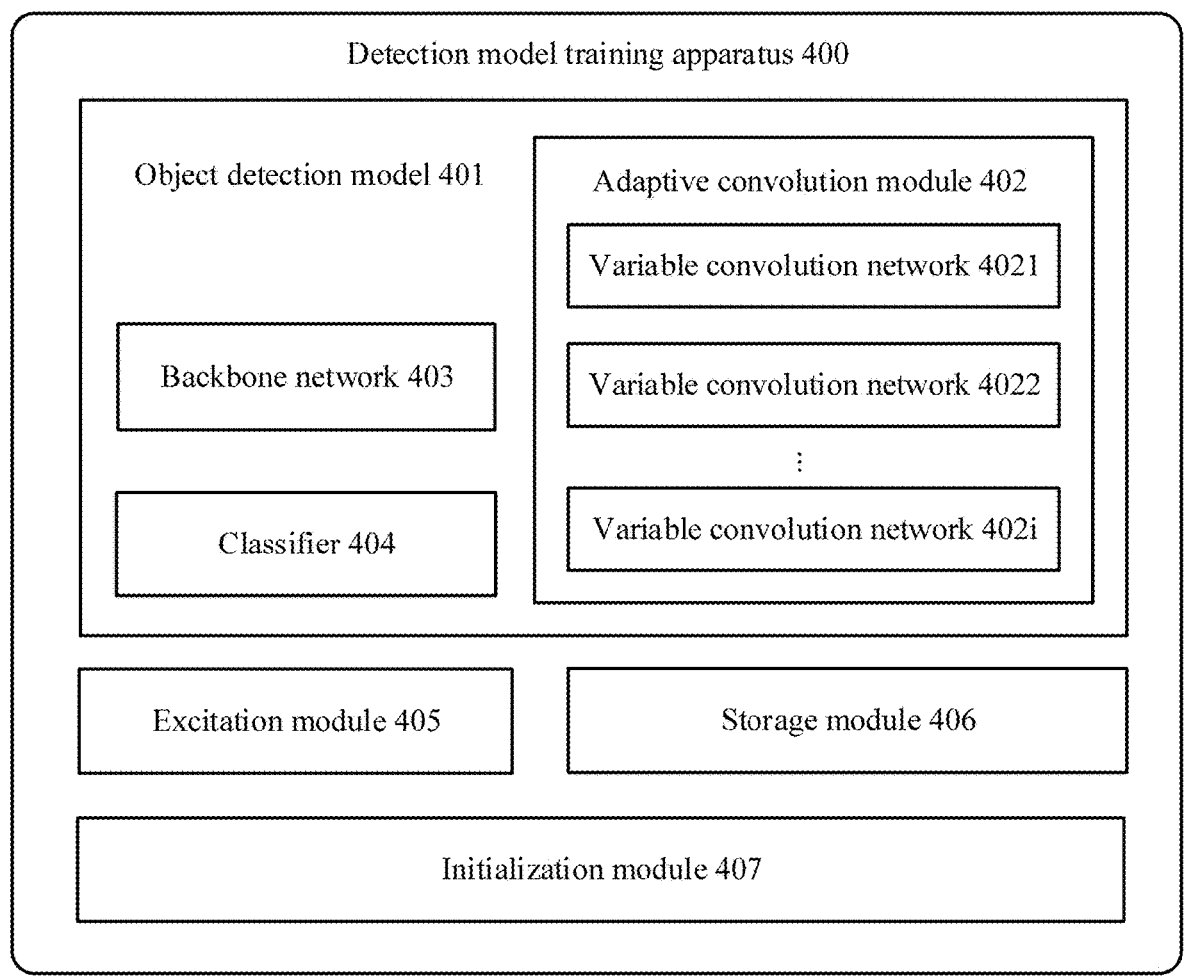
FIG. 14 is a schematic structural diagram of a detection model training apparatus according to this application.

This application further provides a detection model training apparatus 400. As shown in FIG. 14, the detection model training apparatus 400 includes an object detection model 401, an activation module 405, a storage module 406, and an initialization module 407. The object detection model 401 further includes a backbone network 403, a classifier 404, and an adaptive convolution module 402. The adaptive convolution module 402 includes i variable convolution networks.

The foregoing modules may be software modules. The initialization module 407 is configured to perform S201 and S202 to determine each configuration parameter. The object detection model 401 obtains an initial training image from the storage module 406, and performs S203 and S204 based on the configuration parameter determined by the initialization module 407, to establish the backbone network 403 and the adaptive convolution module 402. The adaptive convolution module 402 performs S205, to input features in a last variable convolution layer of the i variable convolution networks into the classifier 404. The classifier 404 is configured to perform S206. The activation module 405 is configured to perform S207.

The detection model training apparatus 400 may be provided to a user as an object detection model training service. For example, as shown in FIG. 14, the detection model training apparatus 400 (or a part of the detection model training apparatus 400) is deployed in a cloud environment. The user selects a backbone network type and some configuration parameters, and places a training image and a prior result of the training image into the storage module 406, and then starts the detection model training apparatus 400 to train the object detection model 401. The trained object detection model 401 is provided to the user, and the user may run the object detection model 401 in a terminal environment of the user or directly sell the object detection model 401 to a third party for use.

Figure 15:
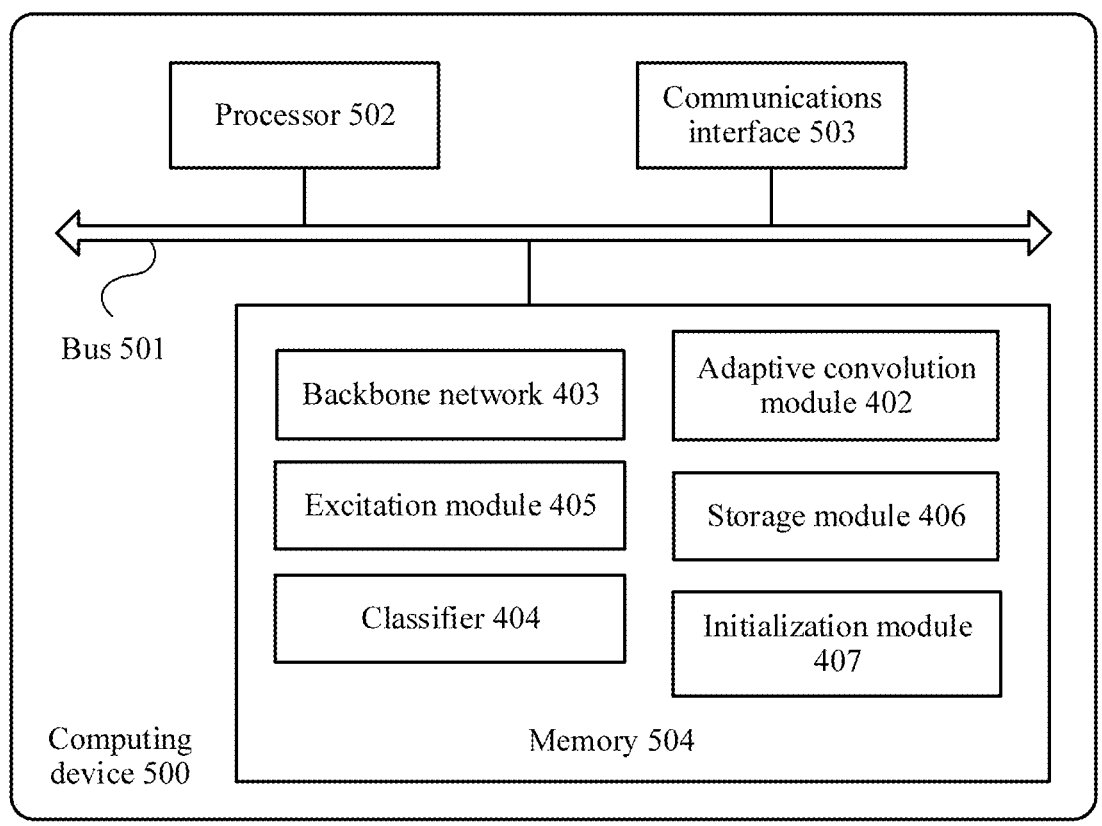
FIG. 15 is a schematic structural diagram of a computing device according to this application.

This application further provides a computing device 500. As shown in FIG. 15, the computing device 500 includes a bus 501, a processor 502, a communications interface 503, and a memory 504. The processor 502, the memory 504, and the communications interface 503 communicate with each other through the bus 501.

The processor may be a central processing unit (CPU). The memory may include a volatile memory, for example, a RAM. The memory may alternatively include a non-volatile memory, for example, a read-only memory (ROM), a flash memory, an HDD, or an SSD. The memory stores an executable code, and the processor executes the executable code to perform the foregoing object detection method. The memory may alternatively include a software module required by another running process, such as an operating system. The operating system may be Linux™, UNIX™, Windows™, or the like.

The memory of the computing device 500 stores code corresponding to each module of the detection model training apparatus 400. The processor 502 executes the code to implement a function of each module of the detection model training apparatus 400, to be specific, performs the method shown in FIG. 13. The computing device 500 may be a computing device in a cloud environment, a computing device in an edge environment, or a computing device in a terminal environment.

Figure 16A:
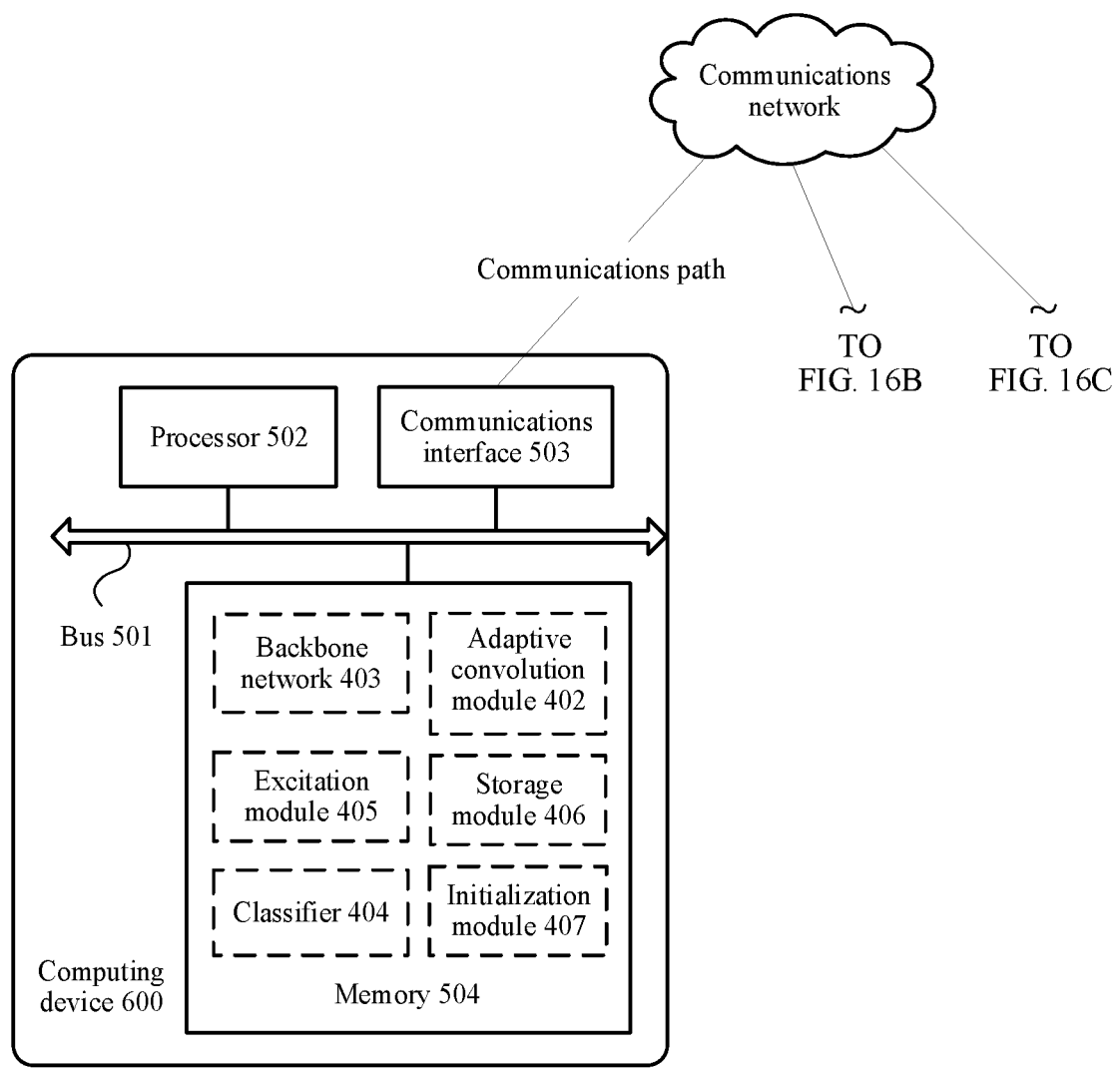
FIG. 16A, FIG. 16B, and FIG. 16C are a schematic structural diagram of a computing device system according to this application.
Figure 16B:
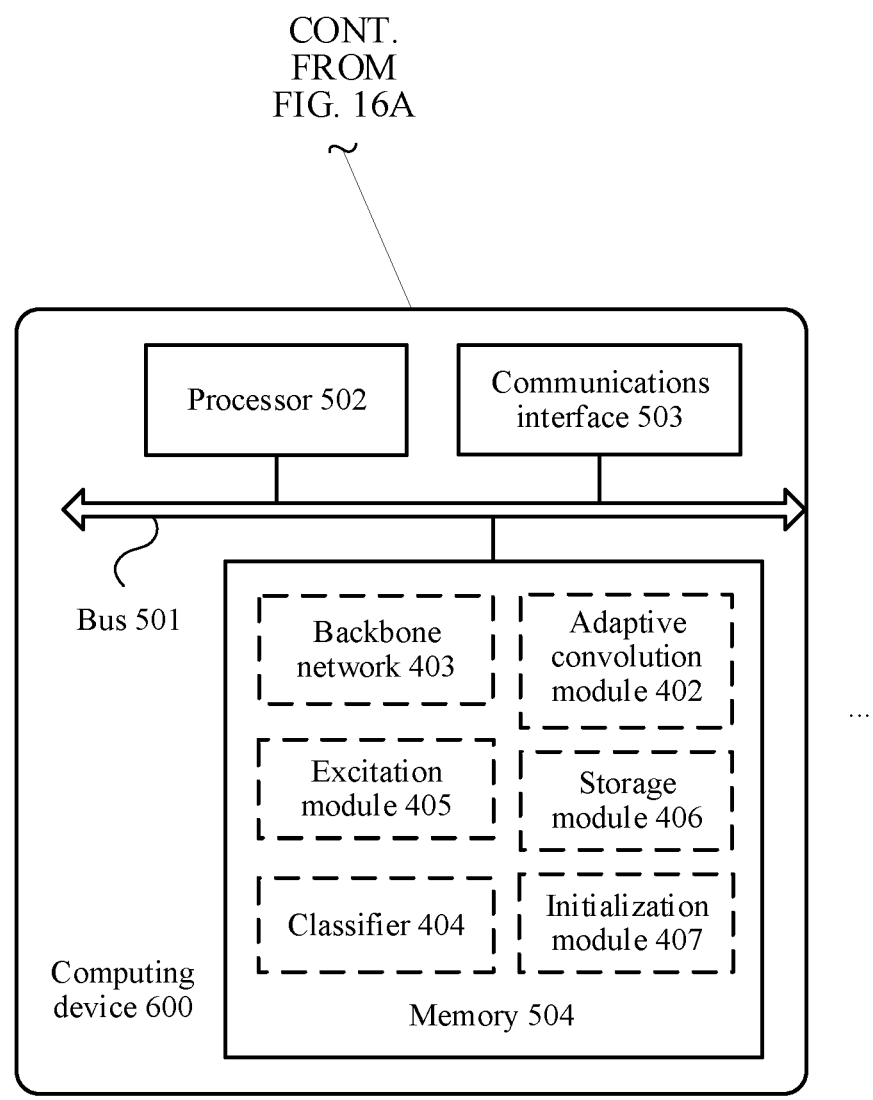
Figure 16C:
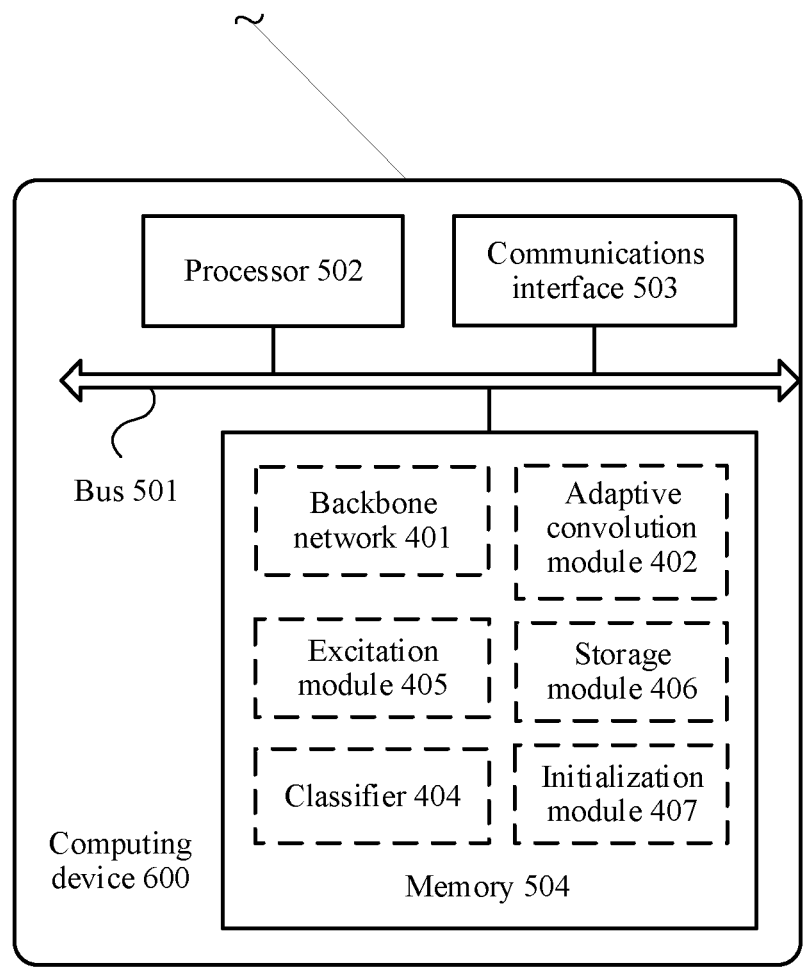

As shown in FIG. 2, various parts of the detection model training apparatus 400 may be executed on a plurality of computing devices in different environments. Therefore, this application further provides a computing device system. As shown in FIG. 16A, FIG. 16B, and FIG. 16C, the computing device system includes a plurality of computing devices 600. A structure of each computing device 600 is the same as a structure of the computing device 500 in FIG. 15. A communication path is established between the computing devices 600 using a communications network. Any one or more of an adaptive convolution module 402, a backbone network 403, a classifier 404, an activation module 405, a storage module 406, and an initialization module 407 is or are run on each computing device 600 activation. Any one of the computing devices 600 may be a computing device in a cloud environment, a computing device in an edge environment, or a computing device in a terminal environment.

Figure 17A:
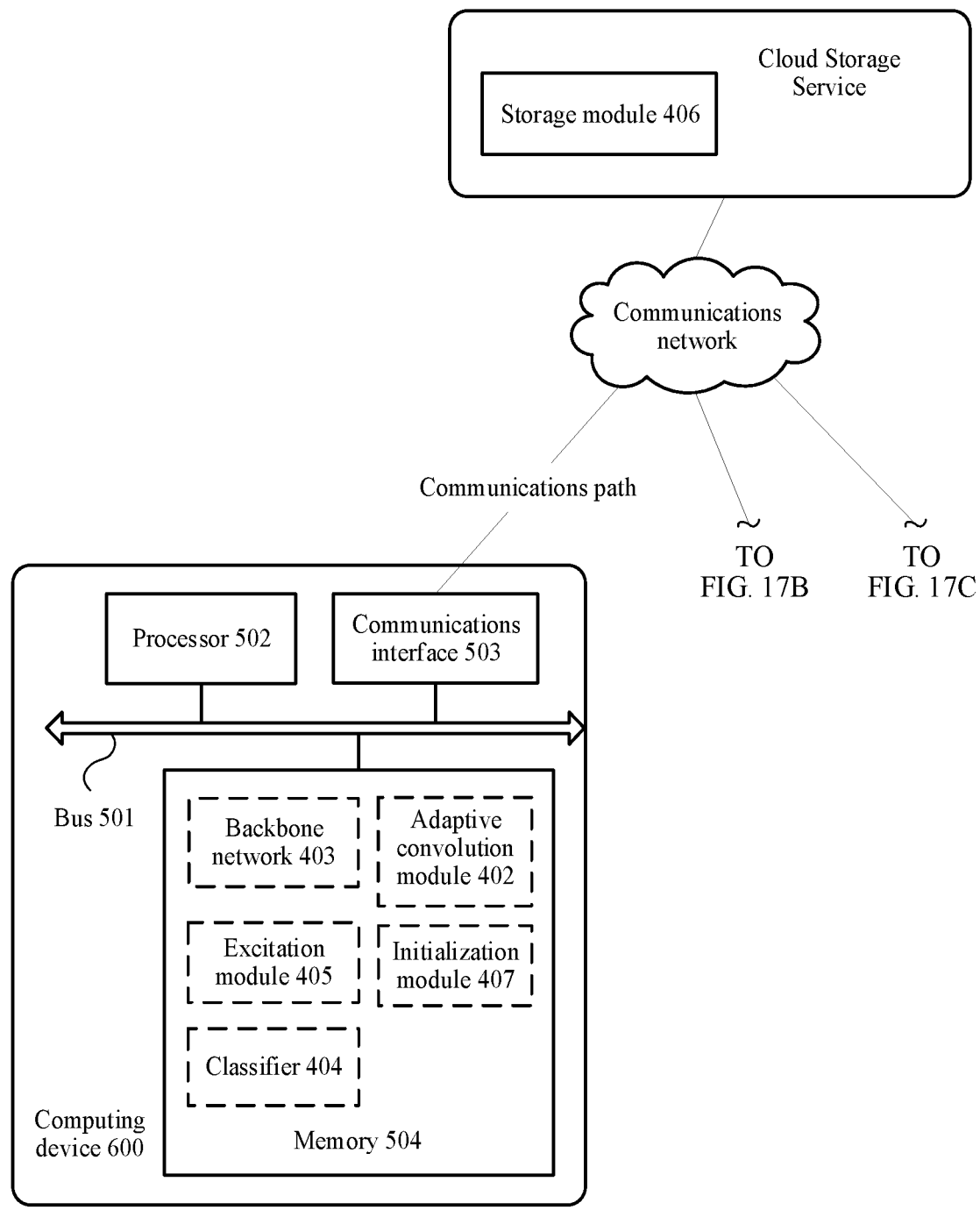
FIG. 17A, FIG. 17B, and FIG. 17C are a schematic structural diagram of another computing device system according to this application.
Figure 17B:
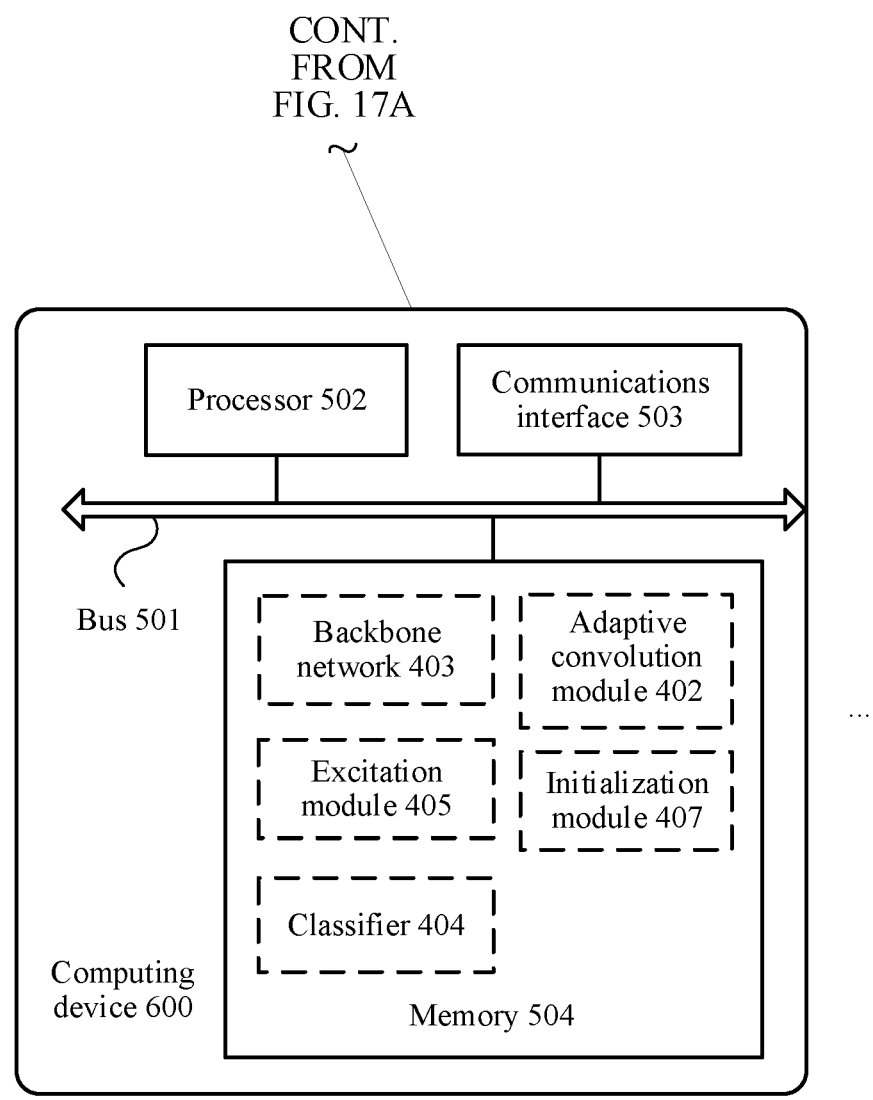
Figure 17C:
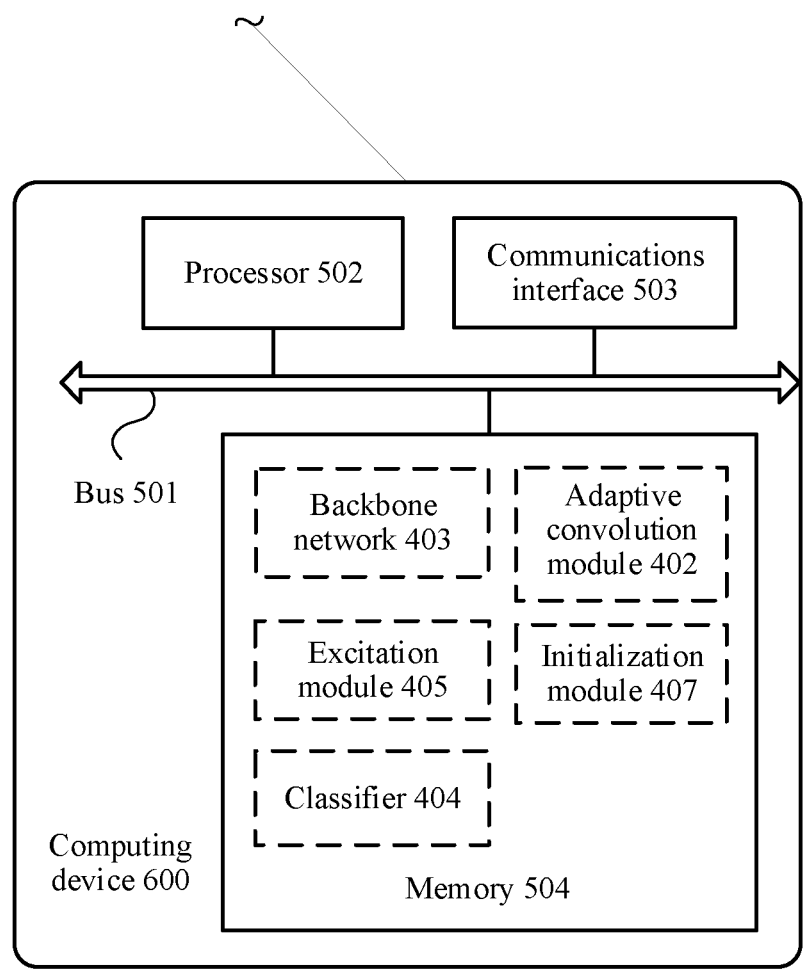

Further, as shown in FIG. 17A, FIG. 17B, and FIG. 17C, because a space occupied by a prior result of a training image and the training image is large, the computing device 600 may not be able to store all training images and prior results of all the training images. This application further provides a computing device system. A storage module 406 is deployed in a cloud storage service (for example, an object storage service). A user applies for a storage space of a specific capacity in the cloud storage service as the storage module 406, and stores the training image and the prior result of the training image into the storage module 406. When a computing device 600 runs, the training image and the prior result of the training image that are required are obtained from the remote storage module 406 using a communications network. Any one or more of an adaptive convolution module 402, a backbone network 403, a classifier 404, an activation module 405, and an initialization module 407 is or are run on each computing device 600 activation. Any one of the computing devices 600 may be a computing device in a cloud environment, a computing device in an edge environment, or a computing device in a terminal environment.

A description of a procedure corresponding to each of the foregoing accompanying drawings has a focus. For a part that is not described in detail in a procedure, refer to a related description of another procedure.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present disclosure are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, microwave, or the like) manner. The computer-readable storage medium may be any usable medium accessible by a computer, or a data storage device, such as a server or a data center, integrating one or more usable media. The usable medium may be a magnetic medium (for example, a FLOPPY DISK, a hard disk, or a magnetic tape), an optical medium (for example, a digital versatile disc (DVD)), or a semiconductor medium (for example, an SSD).

What is claimed is:

1. A method implemented by a computing device and comprising:
    obtaining a system parameter comprising at least one of a receptive field of a backbone network of an object detection model, a first size of a training image, a second size of a to-be-detected object in the training image, a training computing capability, or a complexity of the to-be-detected object;
    determining a configuration parameter of i variable convolution networks based on the system parameter, wherein the configuration parameter comprises at least one of a quantity of the i variable convolution networks, a quantity $L_i$ of variable convolution layers comprised in an $i^{th}$ variable convolution network, a sliding span of a first convolution core of the $i^{th}$ variable convolution network, a maximum offset distance, or a third size of the first convolution core, and wherein both i and $L_i$ are integers greater than zero;
    obtaining the training image;
    establishing the backbone network based on the training image;
    establishing the i variable convolution networks based on a feature map of the backbone network and the configuration parameter, wherein an offset distance does not exceed the maximum offset distance when a second convolution core of each of the variable convolution networks performs a convolution;
    inputting features of the i variable convolution networks into a classifier of the object detection model to obtain the to-be-detected object in the training image;
    comparing the to-be-detected object from the classifier and a prior result of the training image to obtain a comparison result; and
    activating, based on the comparison result, at least one of a model parameter of a third convolution core of the backbone network, model parameters of second convolution cores of the i variable convolution networks, or the maximum offset distance.

2. The method of claim 1, wherein establishing the i variable convolution networks comprises:
    offsetting, in any direction, a first convolution sheet of a fourth convolution core of a first variable convolution layer in the i variable convolution networks by a quantity of features to obtain a second convolution sheet, wherein the quantity of features does not exceed the maximum offset distance; and
    performing the convolution on a model parameter of the first convolution sheet and a feature of the first variable convolution layer corresponding to the second convolution sheet to obtain a feature of a second variable convolution layer of the i variable convolution networks.

3. The method of claim 1, wherein establishing the i variable convolution networks comprises:
    offsetting, in any direction, a first convolution point in a fifth convolution core of a third variable convolution layer in the i variable convolution networks by a quantity of features to obtain a second convolution point, wherein the quantity of features does not exceed the maximum offset distance; and
    performing the convolution on a model parameter of the first convolution point and a feature of the third variable convolution layer corresponding to the second convolution point to obtain a feature in a fourth variable convolution layer of the i variable convolution networks.

4. The method of claim 1, wherein establishing the i variable convolution networks comprises dividing the feature map into i parts, and wherein the i parts respectively serve as an initial variable convolution layer of the i variable convolution networks.

5. The method of claim 1, wherein the training computing capability indicates a computing capability of the computing device.

6. The method of claim 1, wherein the complexity of the to-be-detected object indicates a detection complexity of the to-be-detected object.

7. An apparatus comprising:
    an initialization system configured to:
        obtain a system parameter comprising at least one of a receptive field of a backbone network, a first size of a training image, a second size of a to-be-detected object in the training image, a training computing capability, or a complexity of the to-be-detected object; and
        determine a configuration parameter of i variable convolution networks based on the system parameter, wherein the configuration parameter comprises at least one of a quantity of the i variable convolution networks, a quantity $L_i$ of variable convolution layers comprised in an $i^{th}$ variable convolution network, a sliding span of a first convolution core of the $i^{th}$ variable convolution network, a maximum offset distance, or a third size of the first convolution core, and wherein both i and $L_i$ are integers greater than zero;
    an object detection model system coupled to the initialization system and configured to:
        obtain the training image;

establish the backbone network based on the training image;

establish the i variable convolution networks based on a feature map of the backbone network and the configuration parameter, wherein an offset distance does not exceed the maximum offset distance when a second convolution core of each of the variable convolution networks performs a convolution; and input features of the i variable convolution networks into a classifier of the object detection model system to obtain the to-be-detected object in the training image; and an activation system coupled to the initialization system and the object detection model system and configured to:

compare the to-be-detected object of the classifier and a prior result of the training image to obtain a comparison result; and activate, based on the comparison result, at least one of a model parameter of a third convolution core of the backbone network, model parameters of second convolution cores of the i variable convolution networks, or the maximum offset distance.

8. The apparatus of claim 7, wherein the object detection model system is further configured to:

offset, in any direction, a first convolution sheet of a fourth convolution core of a first variable convolution layer in the i variable convolution networks by a quantity of features to obtain a second convolution sheet, wherein the quantity of features does not exceed the maximum offset distance; and perform the convolution on a model parameter of the first convolution sheet and a feature of the first variable convolution layer corresponding to the second convolution sheet to obtain a feature of a second variable convolution layer of the i variable convolution networks.

9. The apparatus of claim 7, wherein the object detection model system is further configured to:

offset, in any direction, a first convolution point in a fifth convolution core of a third variable convolution layer in the i variable convolution networks by a quantity of features to obtain a second convolution point, wherein the quantity of features does not exceed the maximum offset distance; and perform the convolution on a model parameter of the first convolution point and a feature of the third variable convolution layer corresponding to the second convolution point to obtain a feature in a fourth variable convolution layer of the i variable convolution networks.

10. The apparatus of claim 7, wherein the object detection model system is further configured to divide the feature map into i parts, and wherein the i parts respectively serve as an initial variable convolution layer of the i variable convolution networks.

11. The apparatus of claim 7, wherein the training computing capability indicates a computing capability of the apparatus.

12. The apparatus of claim 7, wherein the complexity of the to-be-detected object indicates a detection complexity of the to-be-detected object.

13. A computing device system comprising:

a plurality of computing devices, wherein each of the computing devices comprises:

a memory configured to store instructions; and a processor coupled to the memory, wherein the instructions cause the processor to be configured to:

obtain a system parameter comprising at least one of a receptive field of a backbone network of an object detection model, a first size of a training image, a second size of a to-be-detected object in the training image, a training computing capability, or a complexity of the to-be-detected object;

determine a configuration parameter of i variable convolution networks based on the system parameter, wherein the configuration parameter comprises at least one of a quantity of the i variable convolution networks, a quantity $L_i$ of variable convolution layers comprised in an $i^{th}$ variable convolution network, a sliding span of a first convolution core of the $i^{th}$ variable convolution network, a maximum offset distance, or a third size of the first convolution core, and wherein both i and $L_i$ are integers greater than zero;

obtain the training image;

establish the backbone network based on the training image;

establish the i variable convolution networks based on a feature map of the backbone network and the configuration parameter, wherein an offset distance does not exceed the maximum offset distance when a second convolution core of each of the i variable convolution networks performs a convolution;

input features of the i variable convolution networks into a classifier of the object detection model to obtain the to-be-detected object in the training image; and compare the to-be-detected object of the classifier and a prior result of the training image to obtain a comparison result; and activate, based on the comparison result, at least one of a model parameter of a third convolution core of the backbone network, model parameters of second convolution cores of the i variable convolution networks, or the maximum offset distance.

14. The computing device system of claim 13, wherein the instructions further cause the processor to be configured to:

offset, in any direction, a first convolution sheet of a fourth convolution core of a first variable convolution layer in the i variable convolution networks by a quantity of features to obtain a second convolution sheet, wherein the quantity of features does not exceed the maximum offset distance; and perform the convolution on a model parameter of the first convolution sheet and a feature of the first variable convolution layer corresponding to the second convolution sheet to obtain a feature of a second variable convolution layer of the i variable convolution networks.

15. The computing device system of claim 13, wherein the instructions further cause the processor to be configured to:

offset, in any direction, a first convolution point in a fifth convolution core of a third variable convolution layer in the i variable convolution networks by a quantity of features to obtain a second convolution point, wherein the quantity of features does not exceed the maximum offset distance; and perform the convolution on a model parameter of the first convolution point and a feature of the third variable convolution layer corresponding to the second convolution point to obtain a feature in a fourth variable convolution layer of the i variable convolution networks.

16. The computing device system of claim 13, wherein the instructions further cause the processor to be configured to divide the feature map into i parts, and wherein the i parts respectively serve as an initial variable convolution layer of the i variable convolution networks.

17. The computing device system of claim 13, wherein the training computing capability indicates a computing capability of a corresponding computing device.

18. The computing device system of claim 13, wherein the complexity of the to-be-detected object indicates a detection complexity of the to-be-detected object.

19. A non-transitory computer readable storage medium configured to store instructions that, when executed by a computing device in a computing device system, cause the computing device to:
  obtain a system parameter comprising at least one of a receptive field of a backbone network of an object detection model, a first size of a training image, a second size of a to-be-detected object in the training image, a training computing capability, or a complexity of the to-be-detected object;
  determine a configuration parameter of i variable convolution networks based on the system parameter, wherein the configuration parameter comprises at least one of a quantity of the i variable convolution networks, a quantity $L_i$ of variable convolution layers comprised in an $i^{th}$ variable convolution network, a sliding span of a first convolution core of the $i^{th}$ variable convolution network, a maximum offset distance, or a third size of the first convolution core, and wherein both i and $L_i$ are integers greater than zero;
  obtain the training image;
  establish the backbone network based on the training image;
  establish the i variable convolution networks based on a feature map of the backbone network and the configuration parameter, wherein an offset distance does not exceed the maximum offset distance when a second convolution core of each of the I variable convolution networks performs a convolution;
  input features of the i variable convolution networks into a classifier of the object detection model to obtain the to-be-detected object in the training image;
  compare the to-be-detected object of the classifier and a prior result of the training image to obtain a comparison result; and
  activate, based on the comparison result, at least one of a model parameter of a third convolution core of the backbone network, model parameters of second convolution cores of the i variable convolution networks, or the maximum offset distance.

20. A non-transitory, computer-readable medium comprising a computer program product that, when executed by a processor, causes a computing device in a computing device system to:
  obtain a system parameter comprising at least one of a receptive field of a backbone network of an object detection model, a first size of a training image, a second size of a to-be-detected object in the training image, a training computing capability, or a complexity of the to-be-detected object;
  determine a configuration parameter of i variable convolution networks based on the system parameter, wherein the configuration parameter comprises at least one of a quantity of the i variable convolution networks, a quantity $L_i$ of variable convolution layers comprised in an $i^{th}$ variable convolution network, a sliding span of a first convolution core of the $i^{th}$ variable convolution network, a maximum offset distance, or a third size of the first convolution core, and wherein both i and $L_i$ are integers greater than zero;
  obtain the training image;
  establish the backbone network based on the training image;
  establish the i variable convolution networks based on a feature map of the backbone network and the configuration parameter, wherein an offset distance does not exceed the maximum offset distance when a second convolution core of each of the i variable convolution networks performs a convolution;
  input features of the i variable convolution networks into a classifier of the object detection model to obtain the to-be-detected object in the training image;
  compare the to-be-detected object of the classifier and a prior result of the training image to obtain a comparison result; and
  activate, based on the comparison result, at least one of a model parameter of a third convolution core of the backbone network, model parameters of second convolution cores of the i variable convolution networks, or the maximum offset distance.

* * * * *

UNITED STATES PATENT AND TRADEMARK OFFICE
CERTIFICATE OF CORRECTION

PATENT NO. : 11,605,211 B2
APPLICATION NO. : 17/036903
DATED : March 14, 2023
INVENTOR(S) : Changzheng Zhang et al.

It is certified that error appears in the above-identified patent and that said Letters Patent is hereby corrected as shown below:

In the Claims

Claim 1, Column 17, Line 60: "each of the variable" should read "each of the i variable"

Claim 7, Column 19, Line 7: "each of the variable" should read "each of the i variable"

Signed and Sealed this
Ninth Day of May, 2023

Katherine Kelly Vidal
*Director of the United States Patent and Trademark Office*